United States Patent
Nguyen et al.

(10) Patent No.: US 7,142,387 B2
(45) Date of Patent: Nov. 28, 2006

(54) METHOD AND APPARATUS POSITIONING A READ HEAD TO FOLLOW A TRACK IN A HARD DISK DRIVE

(75) Inventors: Tung Nguyen, San Jose, CA (US); Bipin Gami, Northridge, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/982,633

(22) Filed: Nov. 5, 2004

(65) Prior Publication Data

US 2006/0098329 A1    May 11, 2006

(51) Int. Cl.
    *G11B 5/596* (2006.01)
(52) U.S. Cl. .................................. 360/77.02
(58) Field of Classification Search ............ 360/77.02, 360/77.08, 77.04, 48; 369/44.29, 44.34
    See application file for complete search history.

(56) References Cited

U.S. PATENT DOCUMENTS

| | | | |
|---|---|---|---|
| 3,881,184 A | 4/1975 | Koepcke et al. | |
| 4,594,622 A * | 6/1986 | Wallis | 360/77.04 |
| 5,237,574 A | 8/1993 | Weng | |
| 5,444,583 A | 8/1995 | Ehrlich et al. | |
| 5,793,559 A | 8/1998 | Shepherd et al. | |
| 6,061,200 A | 5/2000 | Shepherd et al. | |
| 6,198,584 B1 * | 3/2001 | Codilian et al. | 360/48 |
| 6,421,198 B1 * | 7/2002 | Lamberts et al. | 360/77.04 |
| 6,751,043 B1 * | 6/2004 | Magee et al. | 360/77.02 |
| 6,798,606 B1 * | 9/2004 | Tang et al. | 360/77.08 |
| 6,836,453 B1 * | 12/2004 | Fukushima | 369/44.34 |
| 2003/0137906 A1 * | 7/2003 | Tang et al. | 369/44.29 |

\* cited by examiner

*Primary Examiner*—Fred F. Tzeng
(74) *Attorney, Agent, or Firm*—GSS Law Group; Earle Jennings

(57) ABSTRACT

Read positioning method includes adjusting at least one read head position when accessing read track on at least one rotating disk surface based upon Burst Correction Value of nearest write track, when PES burst patterns of read track and nearest write track match. Apparatus supporting read positioning method may include means for at least partly performing each step. At least one means may include at least one instance of at least one of following: computer, finite state machine, neural network and inferential engine. At least one read method for the hard disk drive included. These read methods may be used during initialization and/or normal hard disk drive operation. Hard disk drive may include servo controller driving voice coil actuator and, preferably further driving micro-actuator. The hard disk drive may include more than one rotating disk surface and more than one rotating disk surface.

33 Claims, 16 Drawing Sheets

METHOD AND APPARATUS POSITIONING A READ HEAD TO FOLLOW A TRACK IN A HARD DISK DRIVE

TECHNICAL FIELD

The invention relates to positioning a read head to follow a track on a rotating disk surface within a hard disk drive, during the reading of the track.

BACKGROUND OF THE INVENTION

The invention relates to an improved use of servo track information to follow a track during a read operation. The track is situated on a rotating disk surface in a hard disk drive. Hard disk drives include at least one rotating disk surface accessed by a read-write head mechanically coupled to an actuator arm in a voice coil motor. The invention involves improving the control of at least the voice coil motor, and possibly a micro-actuator. The micro-actuator may be used to provide refinement of the positioning of the read-write head.

The voice coil motor is controlled through electrical stimulation of its voice coil, which interacts with the fixed magnet to pivot at least one actuator arm through the actuator pivot. As the actuator arm pivots, the read-write head is positioned over a data track on the rotating disk surface.

Tracks on a rotating disk surface include both a data track and a servo track. Servo tracks provide positioning information written onto the rotating disk surface. Typical servo track information includes a gray code representation of the track, as well as positional correction information. While in the past a separate rotating disk surface was sometimes reserved for the servo track information, today it is common for the servo track information to be multiplexed with the data on each rotating disk surface to be accessed. The data track is where the data for the application system is stored by the hard disk drive.

Different methods are used to position the read-write head for reading and for writing the data track. When reading the data track, the read head is positioned to follow the servo track of the data track. When writing the data track, the read head is positioned near a different servo track located some distance from the data track. This distance is the distance between the read head and the write head, which today is often over twenty tracks apart.

The process of writing the servo tracks onto a rotating disk surface is known as servo writing. Servo writing may be done inside an assembled hard disk drive. Alternatively, servo writing may be performed before the disks are assembled in the hard disk drive. Given the reliability of the disks today, there are economic advantages to assembling the hard disk drive before servo writing.

Each track on a rotating disk surface typically conforms to an overall structure. For example, a track often includes multiple sectors. Each sector typically includes a collection of at least two, often four and sometimes six Position Error Signal (PES) bursts. While it is possible for an odd number of PES burst signals to be useful, the discussion herein will focus on even numbers of PES burst signals. These PES bursts are written as part of the servo write process. The servo write process is used to operationally define the tracks on the rotating disk surface. The tracks, once operationally defined, persist when the power is turned off to the hard disk drive. The PES bursts allow the servo controller of the hard disk drive to sense the position of the read head over a track to a fraction of the track width. The fraction of the track width may be one half or less of the track width.

Mechanical vibrations are often experienced during the servo writing of tracks. These vibrations may result from external and/or internal vibrations. Mechanical vibration during the servo writing of tracks may result in the PES bursts for a track following a trajectory not exactly matching the track center. The consequence of this trajectory discrepancy is that the PES burst information may mislead a servo-controller, potentially degrading the ability of the hard disk drive system as a whole to position a read head to follow the track.

To minimize the possibility of PES burst trajectory discrepancies misleading the servo controller, several attempts to correct this problem are found in the prior art. Most of these attempts are algorithms designed to correct the trajectory discrepancies found in the PES bursts for a track. Most are based upon some form of iterative learning process. These iterative learning processes tend to collect PES values derived from calculations based upon sampling the track for multiple disk rotations. These collected PES values and/or results of the calculations are usually written to the disk for the tracks showing trajectory discrepancies.

These prior art corrective measures tend to add to the production cost by adding to the time required to initialize the rotating disk surfaces within assembled hard disk drives. In order to minimize production cost, data tracks are scanned to determine the quality of their PES bursts in matching the track trajectory. The prior art PES corrective algorithms are only applied to those tracks with the worst PES bursts. Data tracks with very bad PES quality for write mode are often rejected, rather than incur added production costs.

It is common in the prior art for the metric defining PES quality to differ between read mode and write mode. The PES quality for write mode is commonly seen as more important than the PES quality for read mode. Consequently, the acceptable PES quality for read mode tends to be lower than for write mode.

These conditions in the prior art lead to the following situation. When a hard disk drive has one or more read errors for a track due to poor PES quality for write mode, there is a common approach taken to correct this situation. The approach adjusts the positioning offset around the track for the read head. The read head then attempts to access the track. Depending on the PES quality for write mode, it may take several offset attempts, each for at least one disk rotation, to successfully access the track. This approach is known as an off-track then read retry sequence.

The off-track then read retry sequence is time consuming, and often adds to production expenses during quality testing of assembled hard disk drives. Consequently, it is a common production practice to turn off the off-track then read retry sequence during the initialization of rotating disk surfaces within assembled hard disk drives. This can lead to tracks with poor PES quality for write mode causing their hard disk drives to fail production testing.

What is needed is a quick way to offset the read head position around a track with a high probability of success, when the track has failed to be read. This need extends both to the initialization of a hard disk drive after assembly, as well as to the hard disk drive in normal operation.

BRIEF SUMMARY OF THE INVENTION

The invention includes a read positioning method and apparatus supporting the positioning method in a hard disk drive. The method positions at least one read head accessing a track on at least one rotating disk surface in a hard disk drive. It provides a quick and efficient way to adjust the read position of the read head based upon the Burst Correction Value of the nearest write track, when the PES burst patterns of the read track and nearest write track match.

The apparatus supporting the read positioning method may include a means for at least partly performing each step of the read positioning method. The means may include the following. Means for determining the read PES burst pattern of the read track. Means for using the read track position of the read track to find a nearest write track position for a write track. Means for predicting the write PES burst pattern of the write track. And means for adjusting the read position of the read head by the Burst Correction Value of the write track whenever the write PES burst pattern matches the read PES burst pattern. At least one of the means may include at least one instance of at least one member of the list including a computer, a finite state machine, a neural network and an inferential engine.

The invention includes at least one read method for the hard disk drive. Preferably, the read positioning method may be used after a read access of the read track fails. It often has a high probability of success, without the cost of iterative read access attempts based upon incrementing the read position of the read head. In some embodiments of the invention, after a read access using the read positioning method, the iterative read access attempts may be performed. These read methods may be used during initialization of the hard disk drive, and/or during normal operation of the hard disk drive.

The hard disk drive may include a servo controller driving a voice coil actuator to at least partly position the read head to read the read track on the rotating disk surface. The hard disk drive may further include the servo controller driving a micro-actuator to at least partly position the read head to read the read track on the rotating disk surface.

The hard disk drive may preferably include a computer directing the servo controller. The computer may be accessibly coupled with a memory containing program steps of a program system. The program system may direct the computer to implement the read positioning method and/or one of the invention's methods for reading the track. Preferably, at least one of the steps of the read positioning method may be at least partly implemented as a program step.

The step and/or means and/or program step determining the read PES burst pattern may include accessing a track location table to at least partly derive the read PES burst pattern for the read track position. The track location table may preferably reside in the memory accessibly coupled to the computer directing the servo controller.

The memory may include a non-volatile memory. A version of the program steps may be stored in the non-volatile memory. The version of the program steps preferably implements at least one of the following. An in-place-executable version of the program steps, a relocatable-version of the program steps, and a compression of the program steps.

The servo controller may preferably include a servo computer accessibly coupled with a servo memory. The invention's methods may be implemented in part by a servo program system directing the servo computer. The servo program system preferably includes servo program steps residing in the servo memory. The invention's methods may be implemented at least in part through the servo program steps.

The hard disk drive may include access of more than one rotating disk surface. The hard disk drive may further include access of rotating disk surfaces on more than one rotating disk. In certain embodiments, the track location table may reference a second rotating disk surface. In other alternative embodiments, the second rotating disk surface may be referenced by a second track location table.

DETAILED DESCRIPTION

The invention includes a read positioning method and apparatus supporting the read positioning method in a hard disk drive. The method read positions at least one read head accessing a track on at least one rotating disk surface in a hard disk drive. It provides a quick and efficient way to adjust the read position of the read head based upon the Burst Correction Value of the nearest write track, when the PES burst patterns of the read track and nearest write track match.

Figure 1:
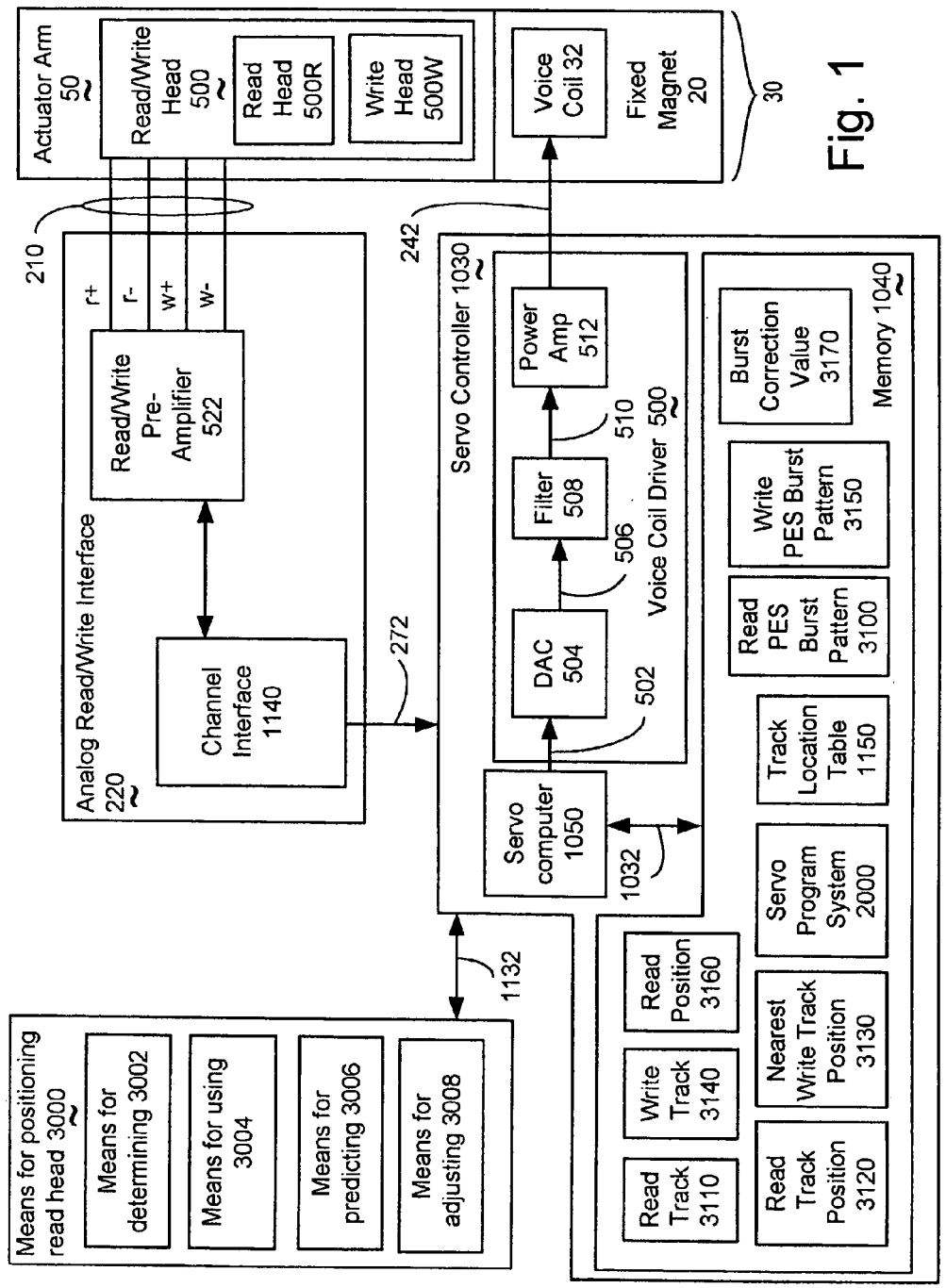
FIG. 1 shows the invention's apparatus within the hard disk drive as the means for positioning at least one read head to access a read track on at least one rotating disk surface.

FIG. 1 shows an apparatus within the hard disk drive 10 supporting the positioning method of the invention by the means for positioning 3000 of at least one read head 500R. The read head 500R reads a read track 18 (shown in FIG. 4) on at least one rotating disk surface 12 in the hard disk drive 10. The read head 50OR is included in a read-write head 500. The read-write head 500 typically includes a separate write head 500W. The read-write head 500 is typically known as a merged read-write head, or as a merged, magnetoresistive read-write head, or further, as a merged, Giant MagnetoResistive (GMR) read-write head.

Figure 2:
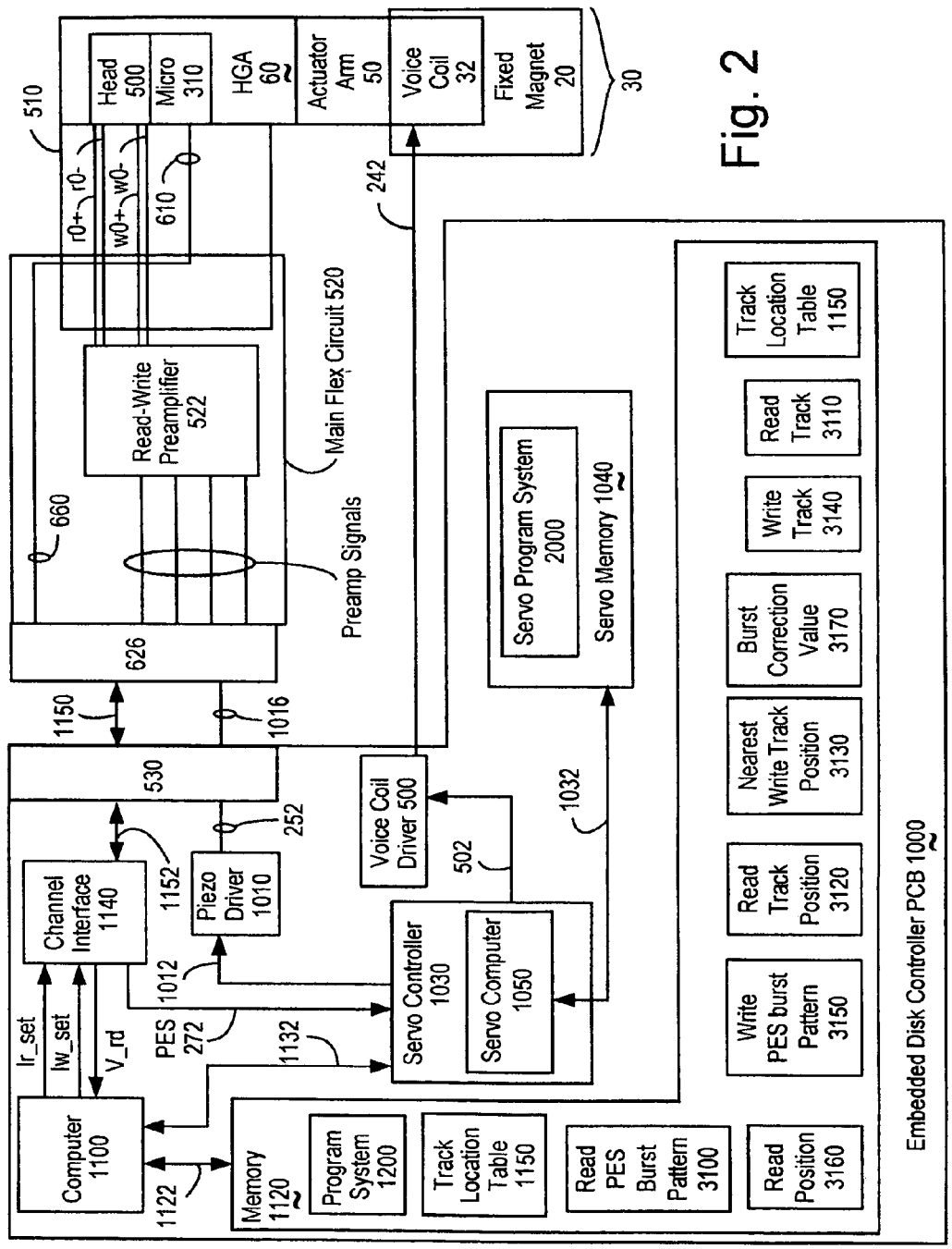
FIG. 2 shows an alternative, often preferred, apparatus within the hard disk drive of FIG. 1, supporting the positioning method implemented by the program system which directs the computer, to at least partly position the read-write head using the voice coil motor and a micro-actuator.

FIG. 2 shows an alternative, often preferred, apparatus within the hard disk drive 10 of FIG. 1, supporting the positioning method implemented by the program system 1200 directing the computer 1100, to at least partly position the read head 50OR using a micro-actuator 310.

Figure 3:
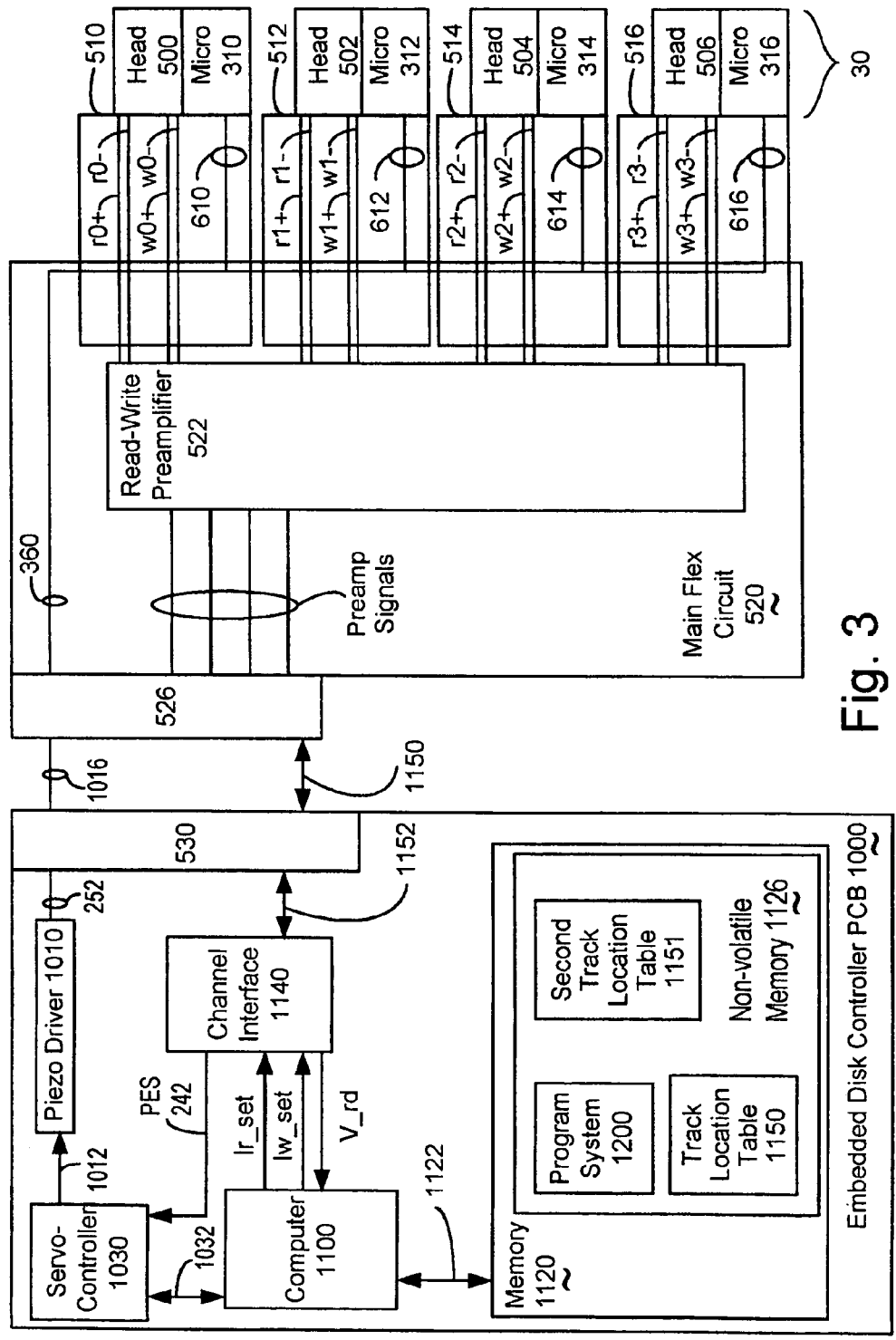
FIG. 3 shows a refinement of the hard disk drive of FIG. 2, supporting multiple read-write heads, each at least partly positioned by separate micro-actuators.

FIG. 3 shows a refinement of the hard disk drive 10 of FIG. 2, supporting multiple read-write heads, each at least partly positioned by separate micro-actuators.

Figure 4:
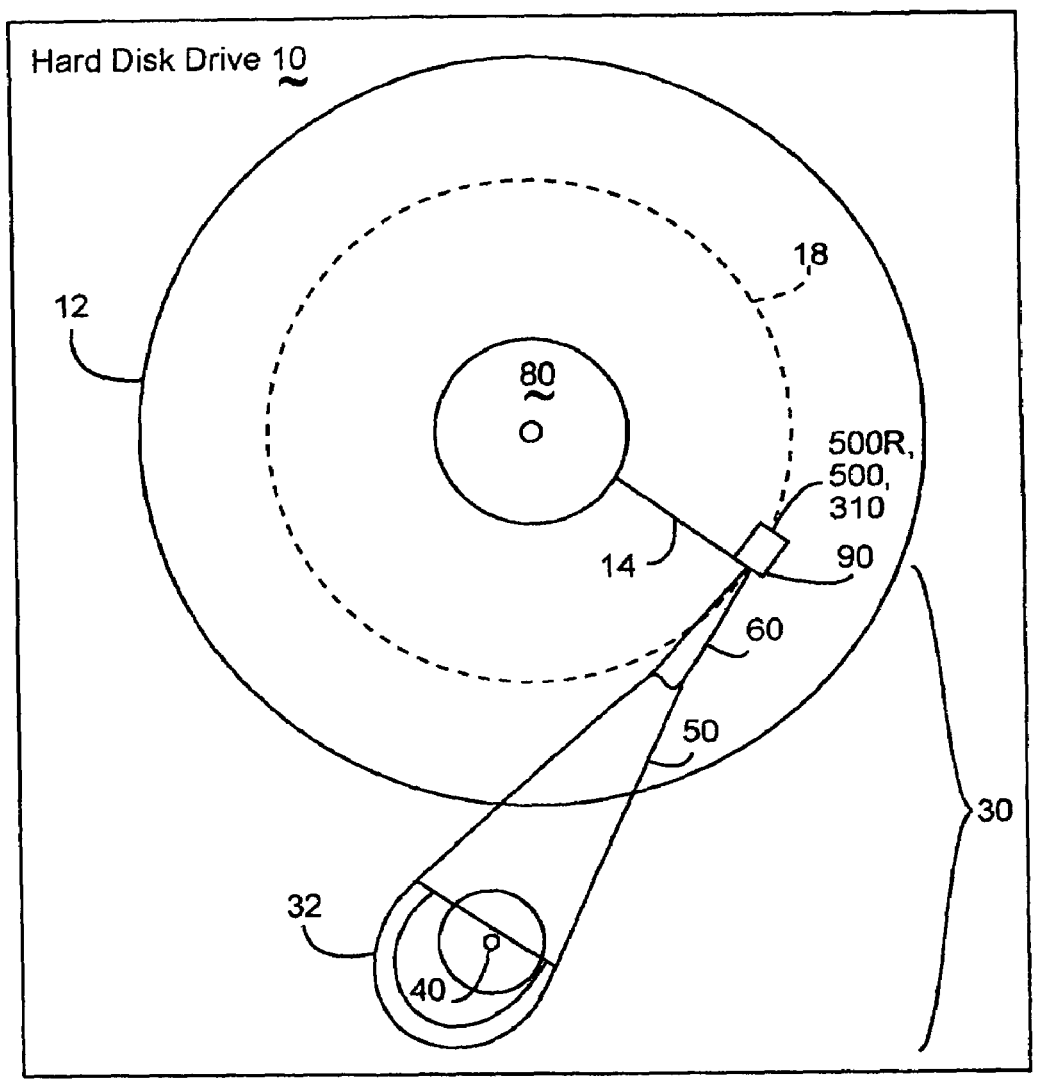
FIG. 4 shows a schematic view of the hard disk drive of FIGS. 1 to 3, showing the read head within the read-write head accessing a track based at least partly upon the lever action of the voice coil motor.

FIG. 4 shows a schematic view of the hard disk drive 10 of FIGS. 1 to 3, with the read head 500R within the read-write head 500, accessing a track 18 as the read track 3110 based at least partly upon the lever action of the voice coil motor 30. The track 18 is located on the rotating disk surface 12.

Figure 5:
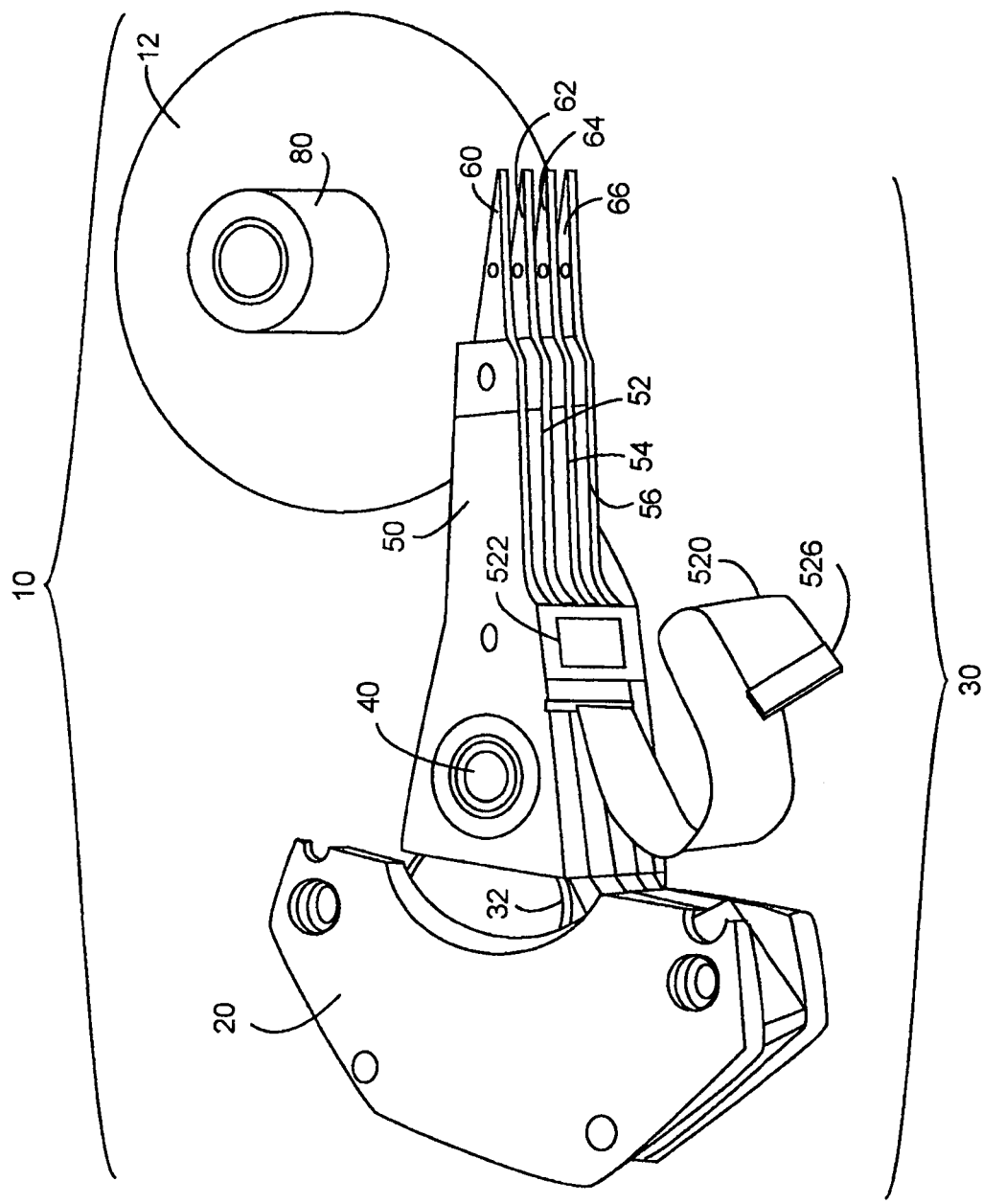
FIG. 5 shows a simplified diagram of the voice coil motor within the hard disk drive of FIGS. 1 to 4.

FIG. 5 shows a simplified diagram of the voice coil motor 30 within the hard disk drive 10 of FIGS. 1 to 4.

The voice coil motor 30 of FIGS. 1 to 5 includes the following. The voice coil 32 is mechanically coupled with at least one actuator arm 50. The head gimbal assembly 60 is coupled with the actuator arm 50. The head gimbal assembly 60 is coupled with the slider 90, which contains the read-write head 500. The voice coil 32 and actuator arm 50 are mounted on an actuator pivot 40. The fixed magnet 20 is assembled about the voice coil 32.

The operation of the voice coil motor 30 of FIGS. 1 to 5 includes the following. A lever action occurs by applying a time-varying electrical signal 242 to the voice coil 32. The time-varying electrical signal 242 causes the voice coil 32 to magnetically interact with the fixed magnet 20, inducing movement of the coupled actuator arm 50 in the plane of the rotating disk surface 12. The motion of the actuator arm 50 through the head gimbal assembly 60, and the slider 90, moves the read-write head 500, which in turn positions the read head 500R and the write head 500W. Today, it is typical that the read head 500R and the write head 500W are concurrently positioned over distinct tracks on the rotating disk surface 12. These concurrent track positions may be more than one, and often over twenty, tracks apart.

Some of the following figures show flowcharts of at least one method of the invention, possessing arrows with reference numbers. These arrows will signify flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to, an instruction processor. The instruction processor includes at least one instruction processing element and at least one data processing element. Each data processing element is controlled by at least one instruction processing element.

Figure 6A:
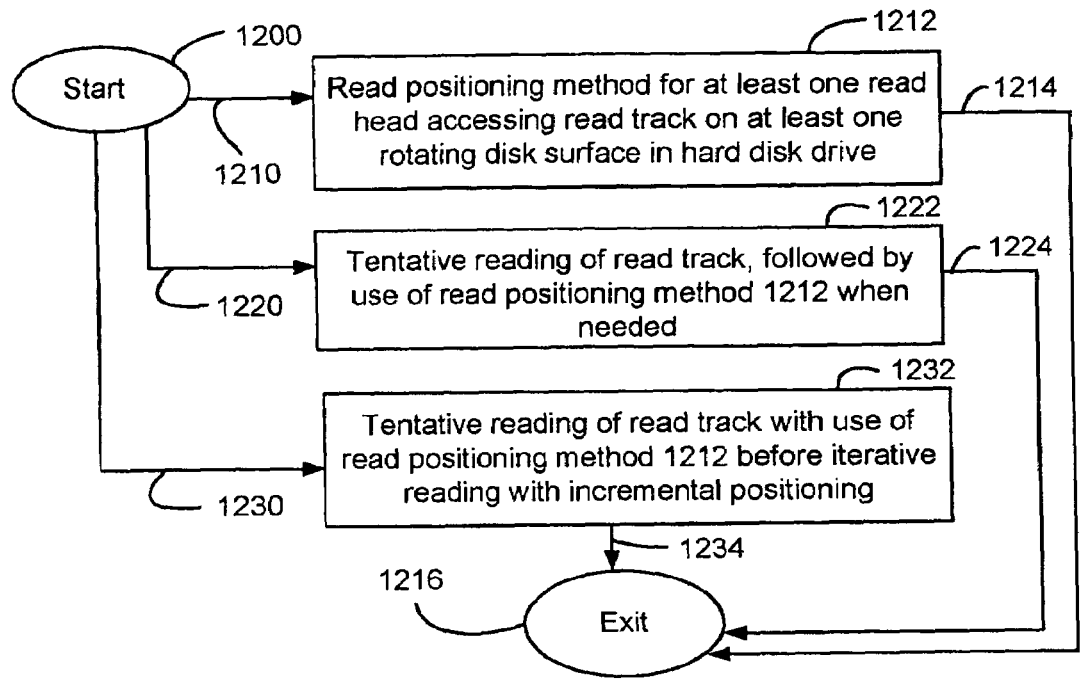
FIG. 6A shows a detail of the program system of FIG. 2 for the method of read positioning and using that method of read positioning.

FIG. 6A shows a detail flowchart of the program system 1200 of FIG. 2 for the method of read positioning, and using the read positioning method, for the read head 500R. Operation 1212 supports the read positioning method for at least one read head 500R accessing a read track 3110 on at least one rotating disk surface 12 in the hard disk drive 10. Operation 1222 supports tentative reading of the read track 3110, followed by use of the read positioning method 1212 when needed. Operation 1232 supports tentative reading of the read track 3110 with use of the read positioning method 1212 before iterative reading with incremental positioning.

Figure 6B:
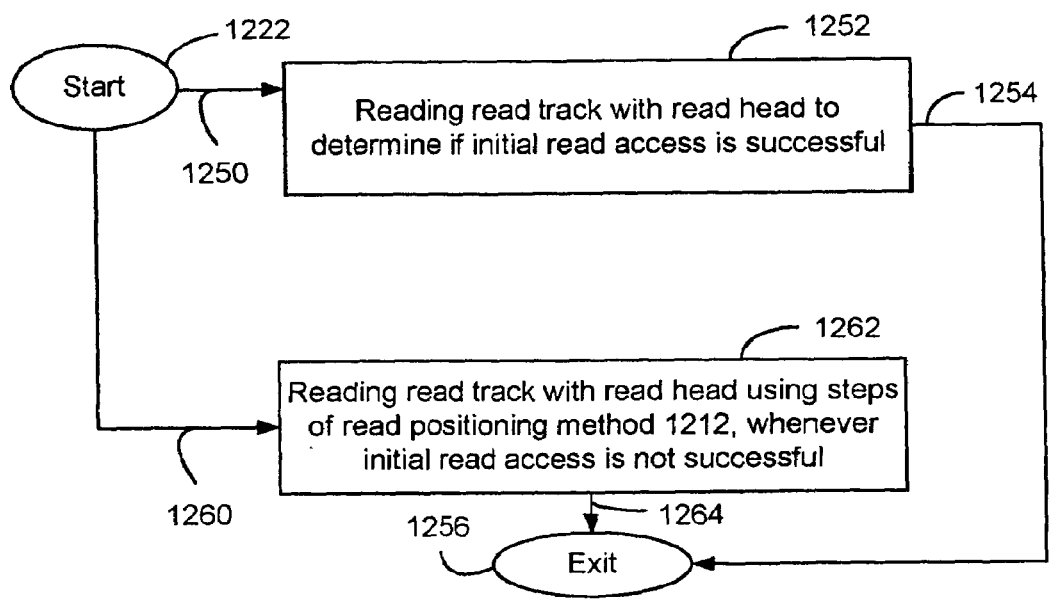
FIG. 6B shows a detail of FIG. 6A further supporting tentative reading of the read track, followed by use of the read positioning method when needed.

FIG. 6B shows a detail flowchart of operation 1222 of FIG. 6A further supporting tentative reading of the read track, followed by use of the read positioning method when needed. Operation 1252 supports reading the read track 3110 with the read head 500R to determine if an initial read access is successful. Operation 1262 supports reading the read track 3110 with the read head 500R using the read positioning method 1212, whenever the initial read access is not successful.

Figure 7A:
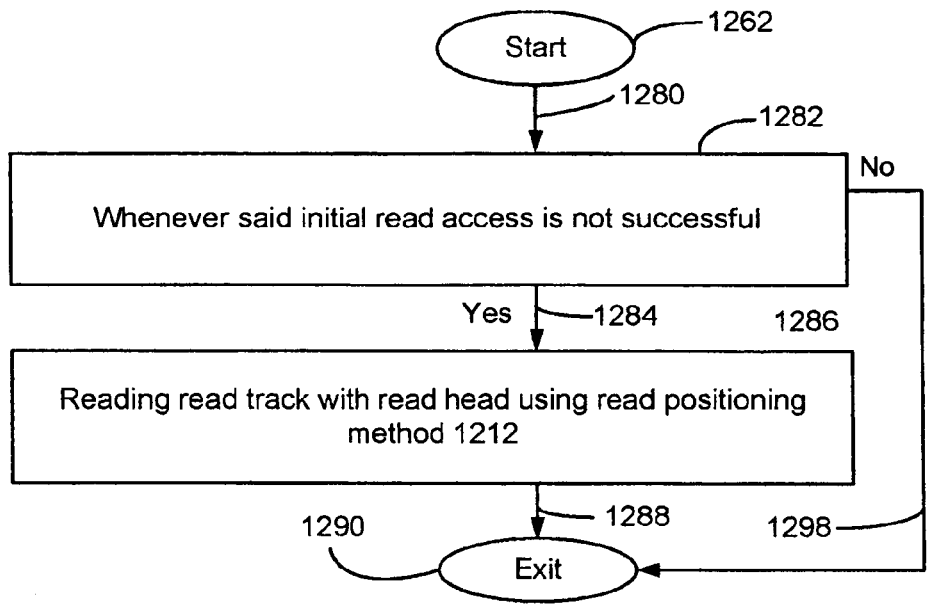
FIG. 7A shows a detail flowchart of FIG. 6B further reading the read track using the read positioning method, whenever the initial read access is not successful.

FIG. 7A shows a detail flowchart of operation 1262 of FIG. 6B further reading the read track 3110 with the read head 500R using the read positioning method 1212, whenever the initial read access is not successful. Operation 1282 determines whenever the initial read access is not successful. When the determination 1284 is Yes, operation 1286 supports reading the read track 3110 with the read head 500R using the read positioning method 1212. When the determination is No, the read position method 1212 is skipped.

Figure 7B:
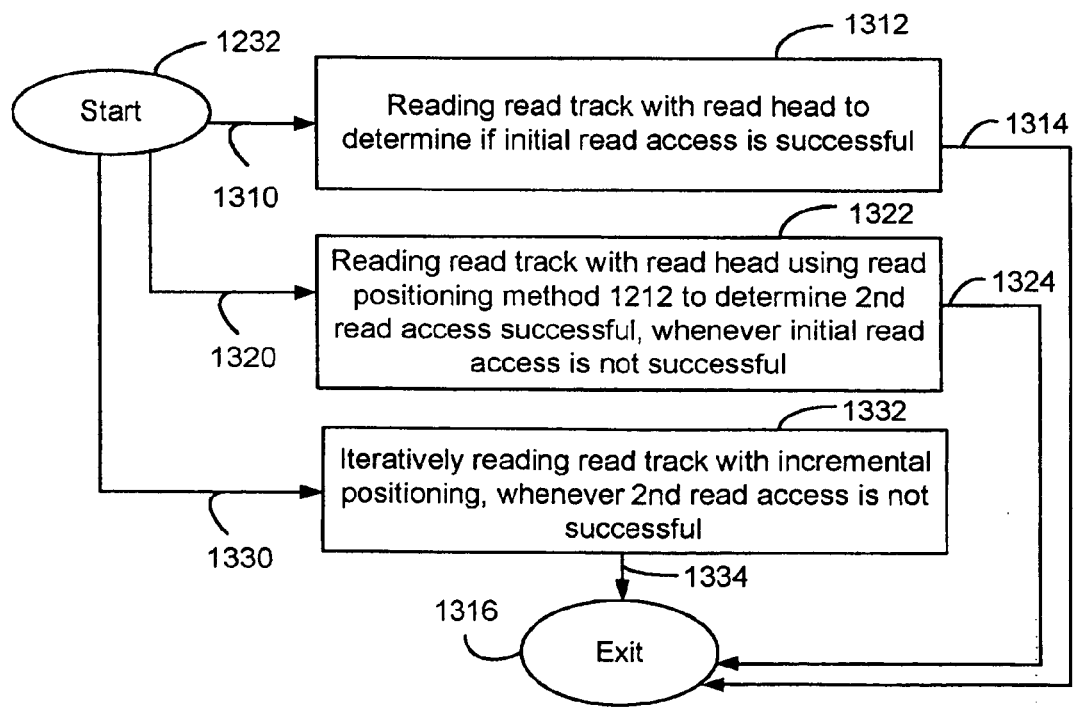
FIG. 7B shows a detail of FIG. 6A further tentatively reading the read track with the use of the read positioning method, before iterative reading with incremental positioning.

FIG. 7B shows a detail flowchart of operation 1232 of FIG. 6A further tentatively reading the read track 3110, with the use of the read positioning method 1212, before iterative reading with incremental positioning. Operation 1312 supports reading the read track 3110 with the read head 500R to determine if an initial read access is successful. Operation 1322 supports reading the read track 3110 with the read head 500R using the read positioning method 1212 to determine if a second read access is successful, whenever the initial read access is not successful. Operation 1332 supports iteratively reading the read track with incremental positioning, whenever the second read access is not successful.

Figure 8:
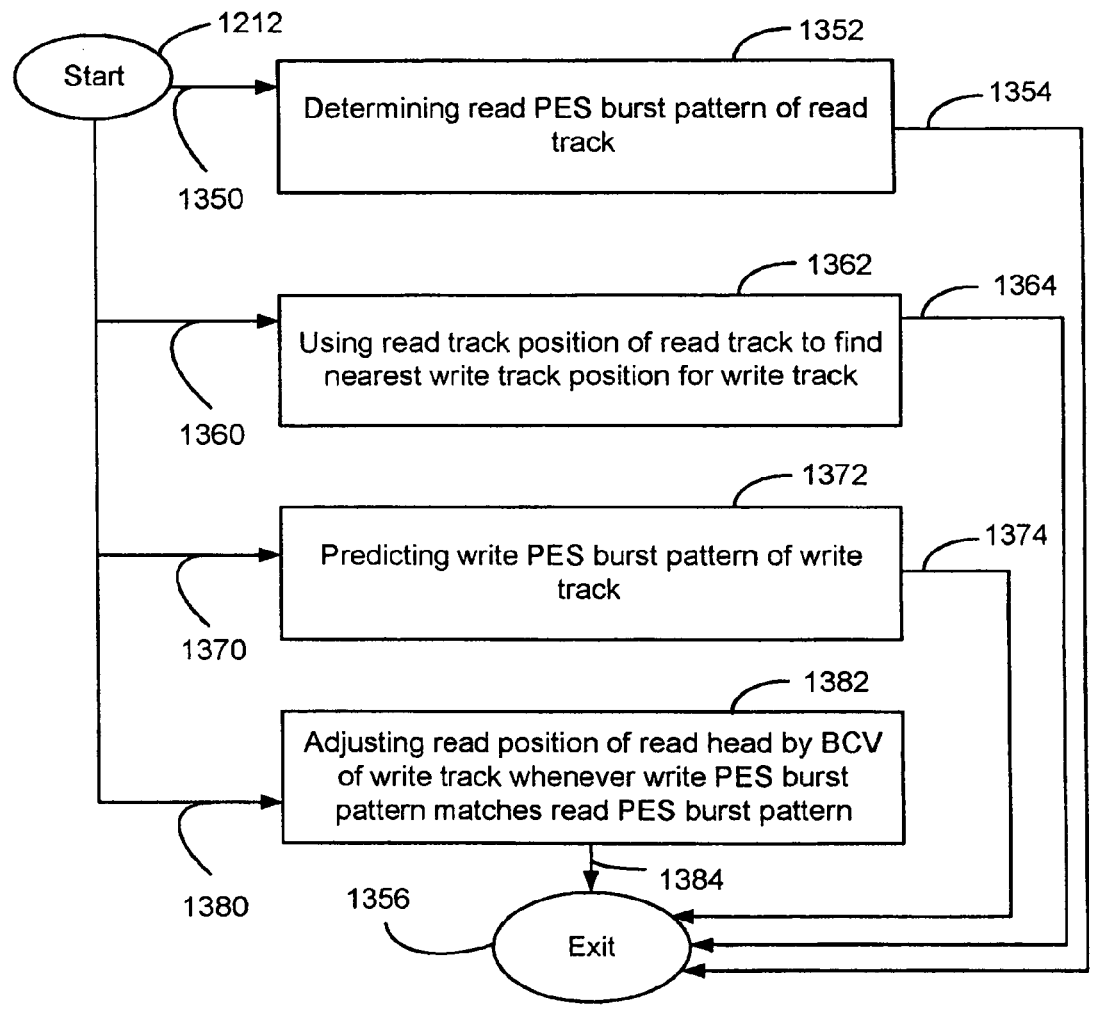
FIG. 8 shows a detail of the read positioning method of FIG. 6A.

FIG. 8 shows a detail flowchart for the read positioning method 1212 of FIG. 6A. Operation 1352 supports determining the read PES burst pattern 3100 of the read track 3110. Operation 1362 supports using the read track position 3120 of the read track 3110 to find a nearest write track position 3130 for a write track 3140. Operation 1372 supports predicting the write PES burst pattern 3150 of the write track 3140. Operation 1382 supports adjusting the read position 3160 of the read head 500R by the Burst Correction Value 3170 (BCV) of the write track 3140 whenever the write PES burst pattern 3150 matches the read PES burst pattern 3100.

Figure 9A:
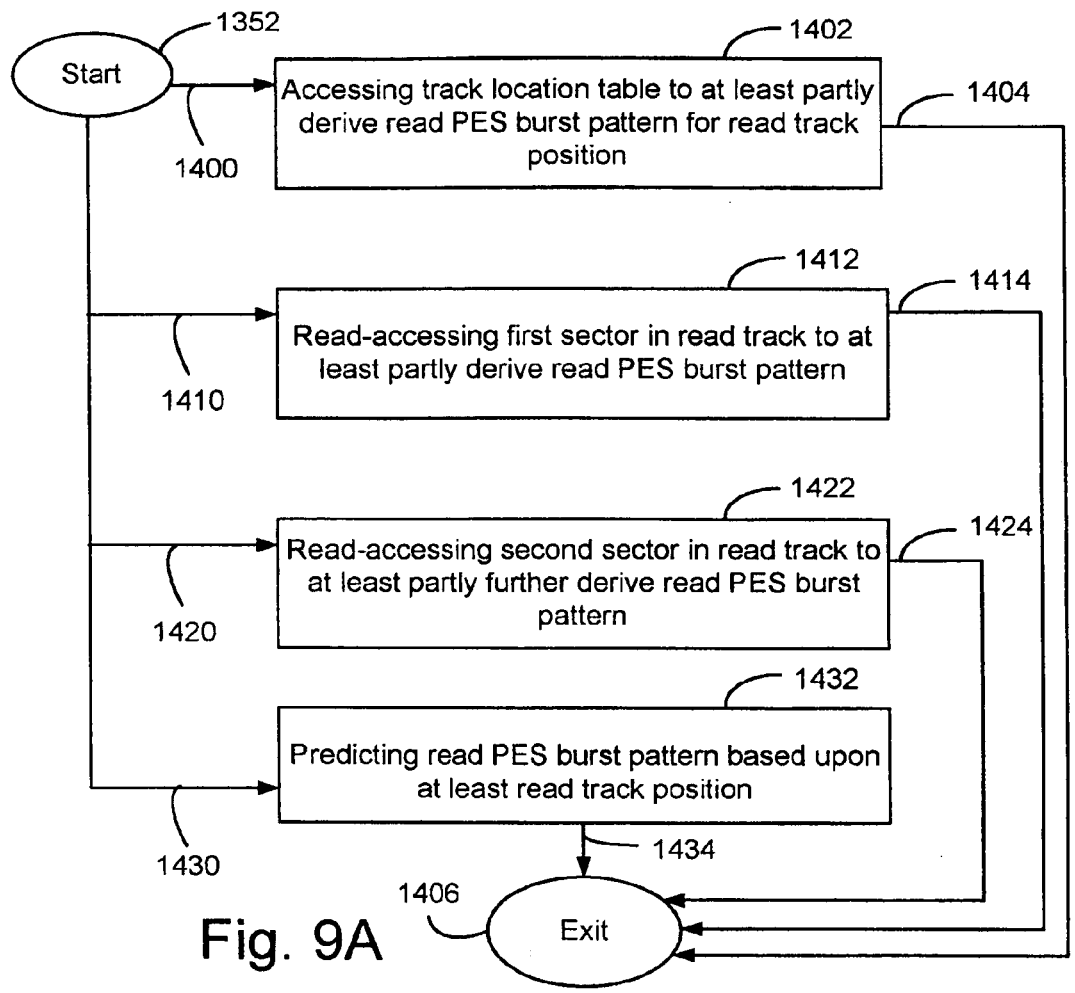
FIG. 9A shows a detail of FIG. 8 further determining the read PES burst pattern.

FIG. 9A shows a detail flowchart of operation 1352 of FIG. 8 further determining the read PES burst pattern 3100 of the read track 3110. Operation 1402 supports accessing the track location table 1150 to at least partly derive the read PES burst pattern 3100 for the read track position 3120. Operation 1412 supports read-accessing a first sector in the read track 3110 to at least partly derive the read PES burst pattern 3100. Operation 1422 supports read-accessing a second sector in the read track 3110 to at least partly further derive the read PES burst pattern 3100. Operation 1432 supports predicting the read PES burst pattern 3100 based upon at least the read track position 3120.

In FIG. 9A, operation 1402 is typically used in the normal operation of the hard disk drive 10. The operations 1412, 1422, and 1432 are more commonly used during initialization of the hard disk drive 10.

Figure 9B:
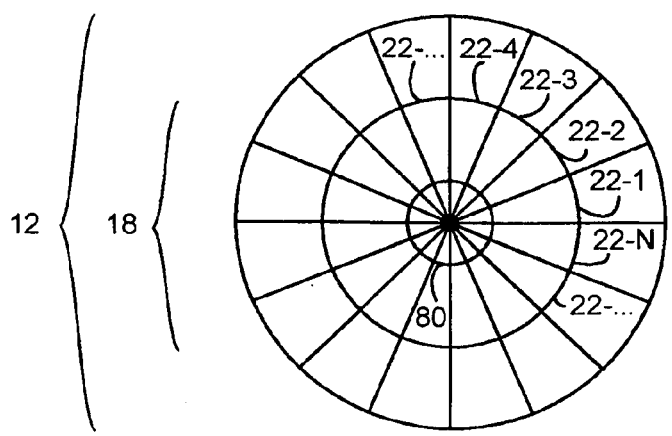
FIG. 9B shows the rotating disk surface including the track, which includes multiple sectors.

FIG. 9B shows the rotating disk surface 12 including the track 18. The track 18 includes N sectors, where N is at least two. The track 18 includes multiple sectors, a first sector 22-1 and a second sector 22-2, etc. until a last sector 22-N. These sectors are successively read or written for the entire track 18 most if not all of the time. The hard disk drive 10 is shown moving the rotating disk surface 12 in a clockwise direction. One skilled in the art will recognize that it is equally feasible to move the rotating disk surface 12 in a counter clockwise direction. The invention is equally applicable and useful to hard disk drive irrespective of whether they rotate disk surfaces in a clockwise or counterclockwise direction. While the Figures and discussion of the application will focus on a clockwise movement of the rotating disk surface, this is being done to simplify the presentation, and is not meant to limit the scope of the claims or the invention.

Figure 10A:
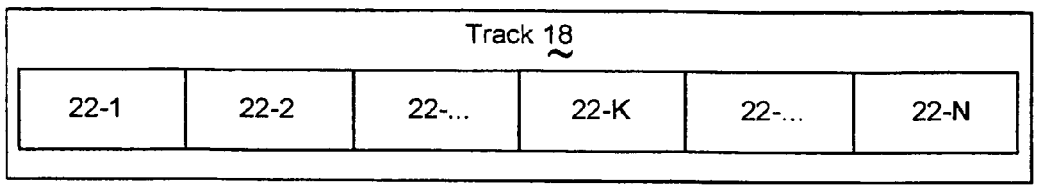
FIG. 10A shows a format-oriented view of the track of FIGS. 4 and 9B including multiple sectors.

FIG. 10A shows a format-oriented view of the track 18 of FIGS. 4 and 9B. The track 18 includes the first sector 22-1, and the second sector 22-2, successively to the last sector 22-N. The track 18 is shown including a generic sector 22-K. The generic sector 22-K typically can be any of the sectors of the track 18. In certain embodiments of the invention, format variations may exist between some of the sectors.

Figure 10B:
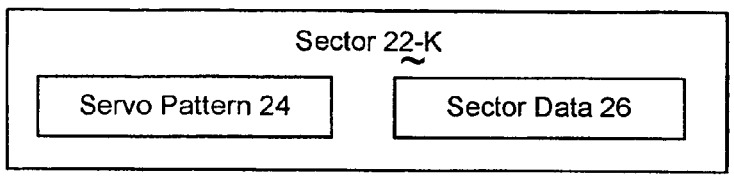
FIG. 10B shows the format-oriented view of the generic sector of FIG. 10A.

FIG. 10B shows the format-oriented view of a generic sector 22-K. The generic sector 22-K includes servo pattern 24 and sector data 26. The servo pattern 24 will be discussed in some detail through FIGS. 10C to 11D. The sector data 26 typically contains a logical data sector and at least an Error Detection Code, often an Error Correction/Detection Code. The local data sector and Error Code fields are read as bits and processed to derive an error corrected/detected indication and an error corrected logical data sector. When the error corrected/detected indication does not indicate uncorrectable errors in the logical data sector, the hard disk drive 10 will use the error corrected logical data sector as the accessed value of the data in the sector data 26.

Figure 10C:
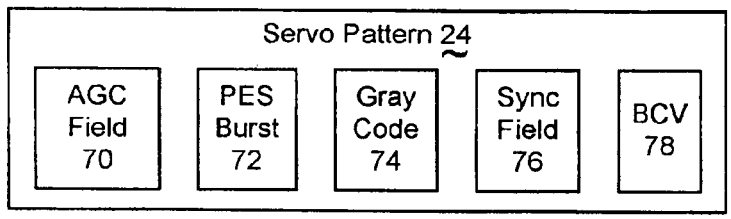
FIG. 10C shows the servo pattern of FIG. 10B.

FIG. 10C shows the servo pattern 24 of FIG. 10B including an AGC field 70, a Position Error Signal burst pattern, which will be referred herein the PES burst pattern 72, a gray code 74, at least one synchronization field 76, and possibly a Burst Correction Value field 78. The Automatic Gain Control, or AGC field 70 is used to calibrate the gain of the read preamplifier in the read-write preamplifier 522, shown in FIGS. 1 to 3. The PES burst pattern 72 is used by the channel interface 1140 to generate the PES signal 272, shown in FIGS. 1 to 3. The synchronization field 76 is used to synchronize the timing for receipt of the sector data 26. In certain embodiments, there may be more than one of the synchronization fields.

In FIG. 10C, the gray code 74 is used to determine the track number, which the read head 500R is targeting. The gray code also acts as the absolute identification of a specific track 18. Each track on a rotating disk surface will have a distinct gray code. Gray codes have the characteristic that two successive gray code values differ in exactly one bit position from each other. The gray code of two successive track consequently differ in only one bit position.

Figure 10D:
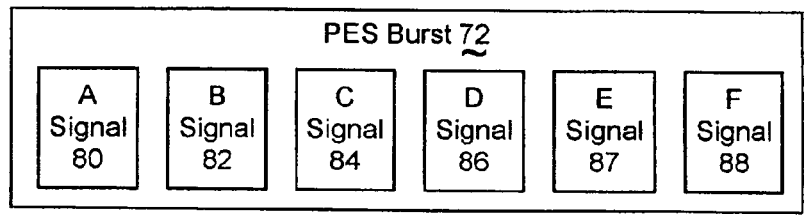
FIG. 10D shows a detail of the PES burst pattern of FIG. 10C.

FIG. 10D shows a detail of the PES burst pattern 72, including at least an A signal 80 and a B signal 82. Frequently, and often preferably, the PES burst pattern 72 also includes a C signal 84 and a D signal 86. In some embodiments of the invention, the PES burst pattern 72 may further, preferably, include an E signal 87 and an F signal 88. To simplify the discussion, the application will focus on the PES burst pattern 72 including the A signal 80, the B signal 82, the C signal 84 and the D signal 86. This is being done strictly to simplify the discussion and is not meant to limit the scope of the invention and its claims.

Figure 10E:
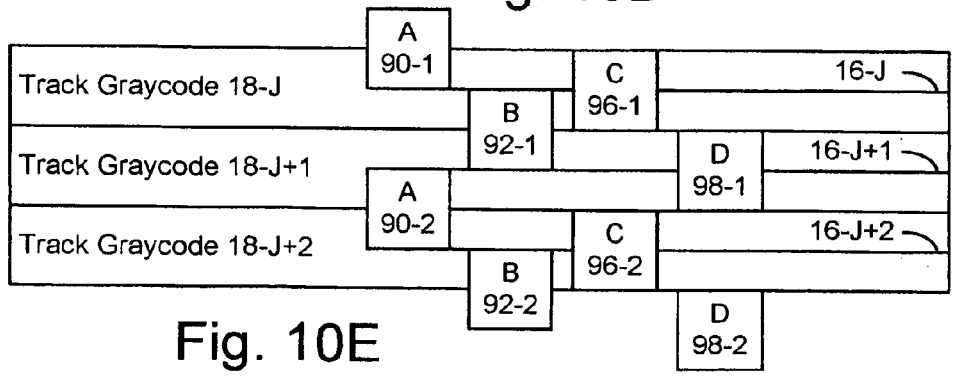
FIG. 10E shows the relationship between the PES burst pattern of FIG. 10C in three successive tracks on the same rotating disk surface.

FIG. 10E shows the relationship between the PES burst pattern 72 in three successive tracks on the same rotating disk surface 12 arranged in the radial direction 14 of FIG. 4. The first track 18-J is written about a first track center path 16-J. The second track 18-J+1 is written about a second track center path 16-J+1. The third track 18-J+2 is written about a third track center path 16-J+2.

In FIG. 10E, the A signal 80, and the B signal 82 are typically written to the rotating disk surface as modulated analog patterns with respect to the center path of each track. The C signal 84 and the D signal 86 are typically written to the rotating disk surface as modulated analog patterns with respect to the midpoint between each pair of tracks. The PES burst pattern 72 typically repeats itself in each generic sector 22-K within a track 18. The PES burst pattern 72 typically repeats itself every two tracks in the radial direction 14 as shown in FIG. 4.

In FIG. 10E, the A signal 80 and the B signal 82 are typically written together on the rotating disk surface 12 centered about the center path of every track. The first A Signal 90-1 and the first B signal 92-1 are centered about the first track center path 16-J of the first track 18-J. The first B signal 92-1 and the second A signal 90-2 are centered about the second track center path 16-J+1 of the second track 18-J+1. The second A signal 90-2 and the second B signal 92-2 are centered about the third track center path 16-J+2 of the third track 18-J+2.

In FIG. 10E, the C signal 84 and the D signal 86 are typically written to the rotating disk surface as modulated analog patterns with respect to the midpoint between each pair of tracks. The first C signal 96-1 and the first D signal 98-1 are centered about the midpoint between the first track center path 16-J and the second track center path 16-J+1. The second C signal 96-2 and the first D signal 98-1 are centered about the midpoint between the second track center path 16-J+1 and the third track center path 16-J+2.

Figure 11A:
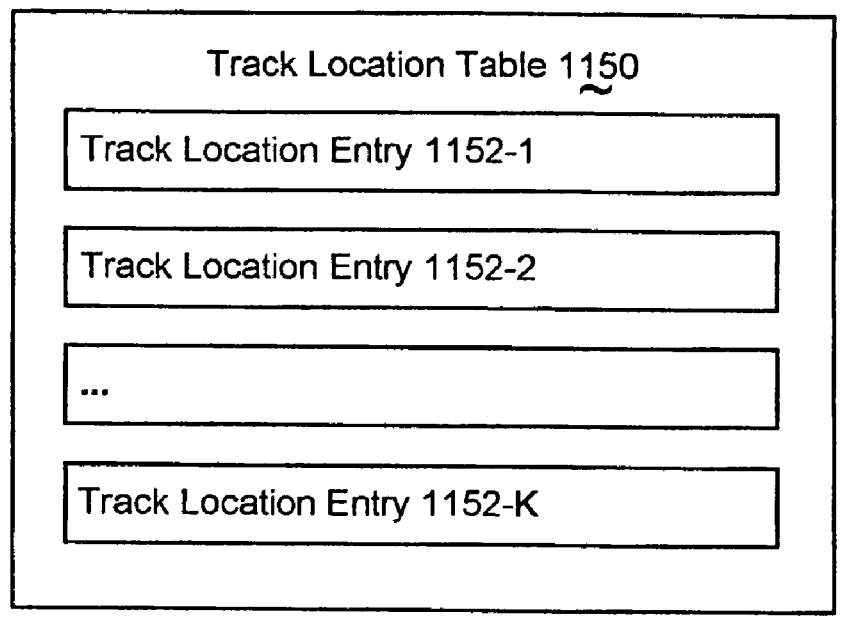
FIG. 11A shows an example structure of the track location table of FIGS. 1 to 3.
Figure 11B:
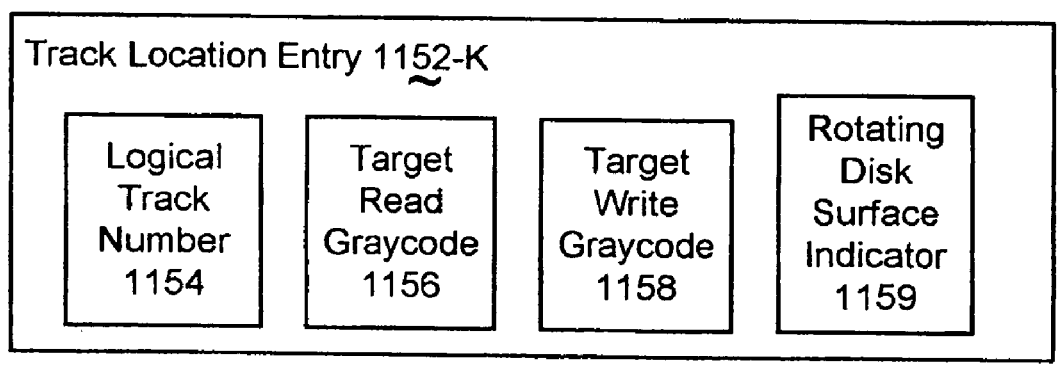
FIG. 11B shows some details of the generic track location entry of FIG. 11A.

FIG. 11A shows an example structure of the track location table 1150 of FIGS. 1 to 3. Typically, there is a track location entry 1152 for each track 18 accessible by the hard disk drive 10. The track location table 1150 includes a first track location entry 1152-1, a second track location entry 1152-2 and a generic track location entry 1152-K FIG. 11B shows some details of the generic track location entry 1152-K of FIG. 11A. Typically, and preferably, the track location table may include the following. A logical track number 1154, which is used by the hard disk drive 10 as the external, logical reference to the track. A target read gray code 1156, which is the gray code of the track to be read when the read head 500R is to read the track 18 associated with the logical track number 1154. The target read gray code may also include a track offset in terms of a fraction of the track width. A target write gray code 1158, which is the gray code of the track to be read by the read head 500R, when the write head 500W is to write the track 18 associated with the logical track number 1154.

Often, the hard disk drive 10 uses more than one rotating disk surface 12 for data storage. In such embodiments, the generic track location entry 1152-K may preferably further include a rotating disk surface indicator 1159 as shown in FIG. 11B. Alternatively, a second track location table 1151, similar to the track location table 1150, may be used to account for the logical tracks of the second rotating disk surface, as shown in FIG. 3.

Figure 11C:
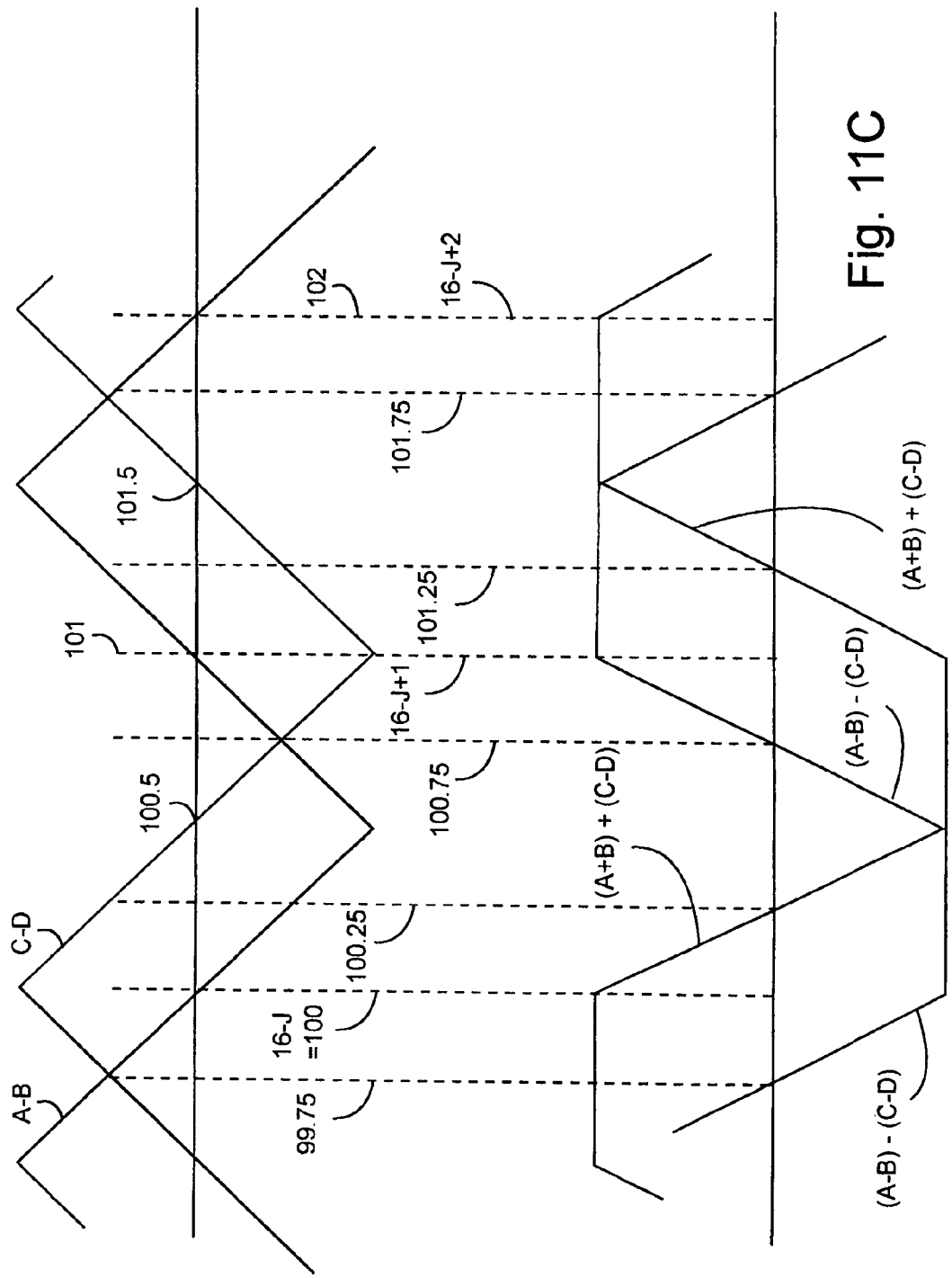
FIG. 11C shows an example of the relationship between derived signals based upon the demodulated PES burst pattern of successive tracks in the hard disk drive of the preceding Figures.

FIG. 11C shows an example of the relationship between derived signals based upon the demodulated PES burst pattern 72 of successive tracks in the hard disk drive 10. The derived signal A–B is created from the demodulated amplitude of the A signal 80 subtracted from the demodulated amplitude of the B signal 82. The derived signal C–D is created from the demodulated amplitude of the C signal 84 subtracted from the demodulated amplitude of the D signal 86.

In FIG. 11C, the derived signal (A–B)+(C–D) is the clamped sum of the derived signal A–B and the derived signal C–D. The clamping of the sum will be assumed to be symmetric about zero, so that following is performed. If (A–B)+(C–D) is greater than or equal to the clamp value, then the derived signal (A–B)+(C–D) equals the clamp value. If (A–B)+(C–D) is greater than the negated clamp value and (A–B)+(C–D) is less than the clamp value, then the derived signal (A–B)+(C–D) equals the value of (A–B)+(C–D). If (A–B)+(C–D) is less than or equal to the negated clamp value and (A–B)+(C–D) is less than the clamp value, then the derived signal (A–B)+(C–D) equals the negated clamp value.

In FIG. 11C, the derived signal (A–B)–(C–D) is the clamped difference of the derived signal A–B and the derived signal C–D derived in a similar fashion to the derived signal (A–B)+(C–D).

To provide the greatest accuracy in deriving the PES signal 272, the channel interface 1140 uses the derived signal which is closest to zero, given the distance of the read head 500R from the center of the track 18. The derived signal closest to zero is considered to provide the preferred estimator for the PES signal 272, because it has the best linearity within the channel interface 1140, in terms of the read head 500R distance from the center of the track 18.

In FIG. 11C, the following derived signals are closest to zero for the read head 500R at different distances from a track center. The distance between a track center and a successive track center will be assumed to be at least 100%, often 125%. The distance of the read head 500R from the track center is called the target location.

In FIG. 11C, if –50% is less than or equal to the target location, and the target location is less than –40%, Then the derived signal C–D is closest to zero. The derived signal C–D is used to estimate the PES signal 272. If –40% is less than or equal to the target location, and the target location is less than –10%, Then the derived signal (A–B)–(C–D) is closest to zero. The derived signal (A–B)–(C–D) is used to estimate the PES signal 272.

In FIG. 11C, if –10% is less than or equal to the target location, and the target location is less than –10%, Then the derived signal (A–B) is closest to zero. The derived signal (A–B) is used to estimate the PES signal 272. If 10% is less than or equal to the target location, and the target location is less than 40%, Then the derived signal (A–B)+(C–D) is closest to zero. The derived signal (A–B)+(C–D) is used to estimate the PES signal 272. If 40% is less than or equal to the target location, and the target location is less than 50%, Then the derived signal C–D is closest to zero. The derived signal C–D is used to estimate the PES signal 272.

In FIG. 11C, an alternative mechanism can be used to select the derived signal closest to zero. If –50% is less than the target location, and the target location is less than or equal to –40%, Then the derived signal C–D is closest to zero. The derived signal C–D is used to estimate the PES signal 272. If –40% is less than the target location, and the target location is less than or equal to –10%, Then the derived signal (A–B)–(C–D) is closest to zero. The derived signal (A–B)–(C–D) is used to estimate the PES signal 272. If –10% is less than the target location, and the target location is less than or equal to –10%, Then the derived signal (A–B) is closest to zero. The derived signal (A–B) is used to estimate the PES signal 272. If 10% is less than the target location, and the target location is less than or equal to 40%, Then the derived signal (A–B)+(C–D) is closest to zero. The derived signal (A–B)+(C–D) is used to estimate the PES signal 272. If 40% is less than the target location, and the target location is less than or equal to 50%, Then the derived signal C–D is closest to zero. The derived signal C–D is used to estimate the PES signal 272.

Figure 12:
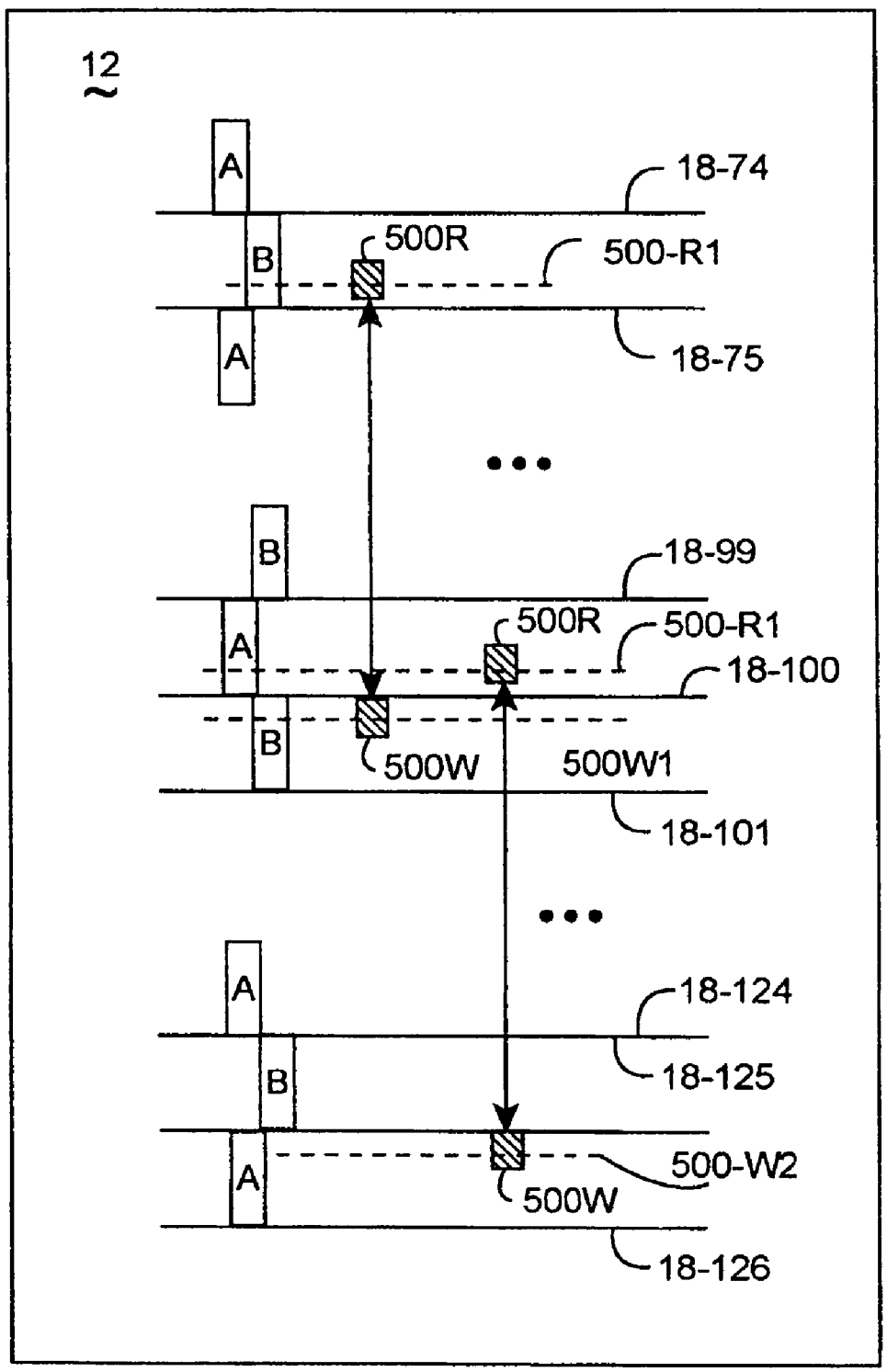
FIG. 12 shows a schematic top view of the read head and the write head located above tracks of the rotating disk surface when reading and writing a logical track.

FIG. 12 shows a schematic top view of the read head 500R and the write head 500W located above tracks of the rotating disk surface 12 when reading and writing a logical track. By way of example, consider accesses to logical track number 30 and logical track number 50 both located on the rotating disk surface 12. The distance between the read head 500R and the write head 500W will be assumed to be 25 and one half of the gray code tracks. The data tracks will be assumed to be spaced every one and a quarter of the gray code tracks. The read head location for writing 500-R1 is the track location that the read head 500R targets for the write head 500W to write a track 18, given the distance between the read head 500R and the write head 500W.

TABLE ONE

An example of the track location table 1150 of FIGS. 1 to 3, 9A, and 11A with each row representing the generic track location entry 1152-K.

| Logical track number 1154 | Target write gray code 1158 | Target read gray code 1156 |
|---|---|---|
| 29 | 73.5 | 99 |
| 30 | 74.75 | 100.25 |
| 31 | 76 | 101.5 |
| ... | ... | ... |
| 49 | 98.5 | 124 |
| 50 | 99.75 | 125.25 |
| 51 | 101 | 126.5 |
| ... | ... | ... |

Each generic track location entry 1152-K in Table One includes the following: The logical track number 1154 is in the first column entry on the left. The target write gray code 1158 is in the middle column. The target write gray code 1158 may also include a fractional part, indicating which of the derived signals for the PES burst pattern 72 will be closest to zero and offer the best estimator for the channel interface 1140 to use in generating the PES signal 272. The target read gray code 1156 is in the third column from the left. Note that the target read gray code 1156 may include a fractional part, indicating which of the derived signals for the PES burst pattern 72 will be closest to zero and offer the best estimator for the channel interface 1140 to use in generating the PES signal 272.

Consider writing the track 18 for the logical track number 1154 with value of 30, as shown in the second row from the top in the example Table One. For convenience, refer to this track as data track 30. According to the example of the track location table 1150 found in Table One, the value of the target write gray code 1158 is 74.75. FIG. 12 shows read head 500R following at the read head location for writing 500-R1, which is positioned 25% above the gray code track 74, referenced as 18–74. This is the track location with the target write gray code 1158 value, of 74.75.

Consider writing the track 18 associated with the logical track number 1154 having the value of 50, as found in the second row from the bottom in the example Table One. For convenience, refer to this track as data track 50. According to the example of the track location table 1150 found in Table One, the value of the target write gray code 1158 is 99.75. FIG. 12 shows read head 500R following at the second read head location for writing 500-R2, which is repositioned 25% above the gray code track 100, referenced as 18–100. This is the track location associated with the target write gray code 1158 value of 99.75.

Now consider what happens if a read attempt fails for either of the two read methods portrayed as operations 1222 or 1232 in FIGS. 6A to 7B. Suppose the read head 500R is attempting to read data track 30 and fails, leading to using the read positioning method. The read positioning method is described in FIGS. 8 and 9A.

In FIG. 8, operation 1352 determines the read PES burst pattern 3100 for the read track 3110 value of 30. FIG. 9A includes operation 1402, which accesses the track location table 1150 as shown in the example Table One. The second row, third column from the left indicates a target read gray code 1156 value of 100.25, which is the determined read track position 3120. The fractional part is 0.25 or 25% indicating the AB PES burst pattern can be used.

In FIG. 8, operation 1362 uses the read track position 3120 to determine the nearest write track position 3130 for the write track 3140. Examining Table One, we find the nearest write track position in Column 2 is 99.75, for data track 50, which is the value of the write track 3140.

In FIG. 8, operation 1372 predicts the write PES burst pattern 3150 of the write track 3140. Again referring to Table One, the fractional part of the nearest write track position value is 100–0.25, or 25% indicating the same PES burst pattern can be used, based upon FIG. 10E.

In FIG. 8, operation 1382 uses the Burst Correction Value 3170 of the write track to offset position of the read head 500R, since the same PES burst patterns can be used.

Figure 13:
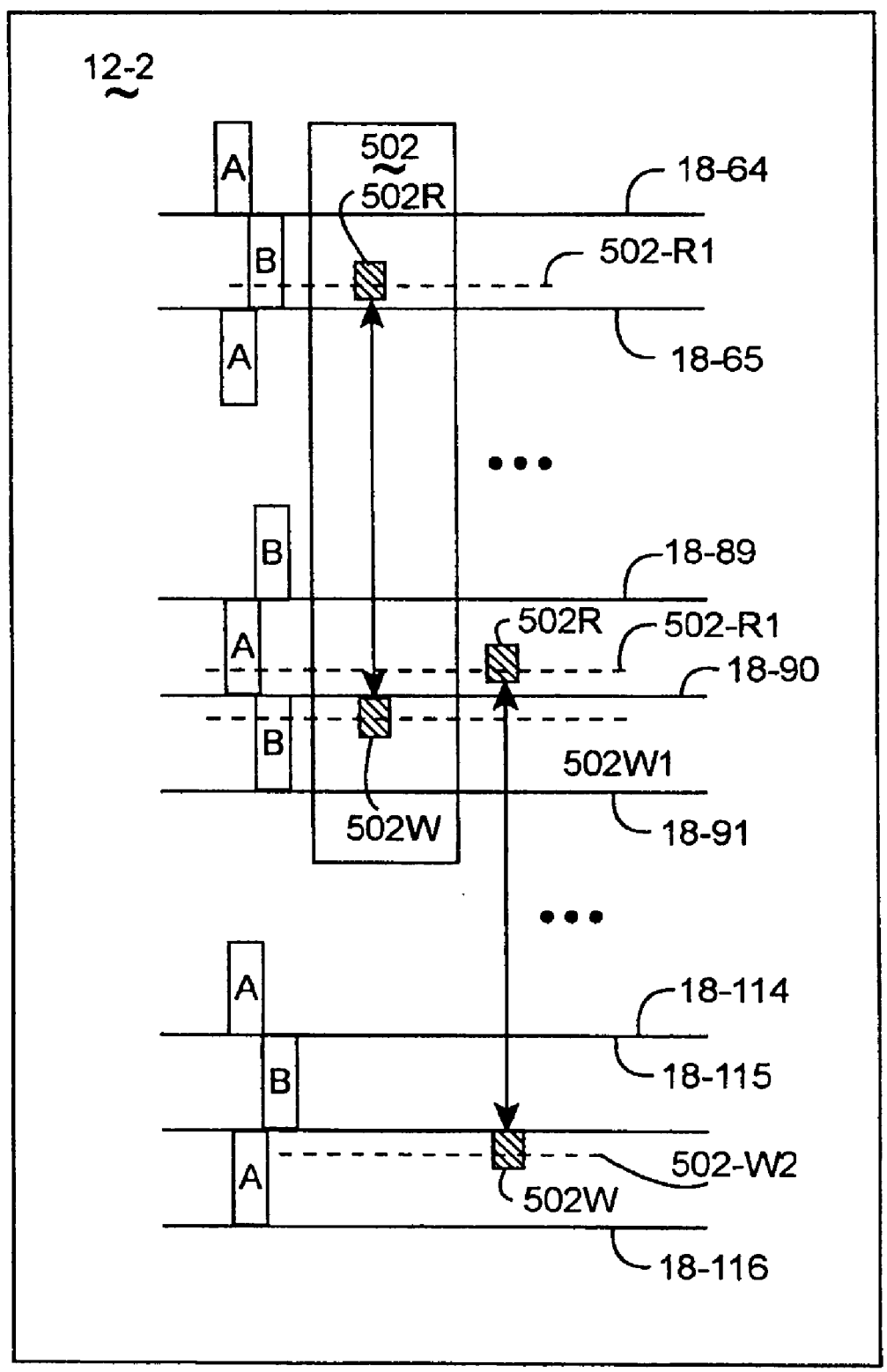
FIG. 13 shows a schematic top view of a second read-write head, which includes a second read head and a second write head located above tracks of a second rotating disk surface when reading and writing the logical track.

FIG. 13 shows a schematic top view of a second read-write head 502, which includes a second read head 502R and a second write head 502W located above tracks of a second rotating disk surface 12-2 when reading and writing a logical track. By way of example, consider accesses to logical track number 130 and logical track number 150 both located on the second rotating disk surface 12-2. The distance between the second read head 502R and the second write head 502W will be assumed to be 25 and one half of the gray code tracks. The data tracks will be assumed to be spaced every one and a quarter of the gray code tracks. The second read head location for writing 502-R1 is the track location the second read head 502R targets for the second write head 502W to write a track 18 when traveling over the second rotating disk surface 12-2.

The second rotating disk surface 12-2 of FIG. 13 and the rotating disk surface 12 of the preceding Figures may belong to the same rotating disk. Alternatively, they may belong to distinct rotating disks included in the hard disk drive 10. The method and apparatus of the invention applies to embodiments with more than two rotating disk surfaces. The method and apparatus of the invention applies to embodiments with more than one rotating disk.

Apparatus supporting the read positioning method 1212 may include a means for at least partly performing each step or operation of the read positioning method shown in FIGS. 6A to 8 and 14. The means may include the following as shown in FIG. 1. Means for determining 3002 the read PES burst pattern 3100 of the read track 3110. Means for using 3004 the read track position 3120 of the read track 3110 to find a nearest write track position 3130 for a write track 3140. Means for predicting 3006 the write PES burst pattern 3150 of the write track 3140. And means for adjusting 3008 the read position 3160 of the read head 500R by the Burst Correction Value 3170 of the write track 3140 whenever the write PES burst pattern 3150 matches the read PES burst pattern 3100. Further, the means for positioning 3000 may entirely provide the apparatus supporting the read positioning method 1212 of FIGS. 6A to 8, and 14.

At least one of the means 3000 to 3008 may include at least one instance of at least one member of the list including: a computer, a finite state machine, a neural network and an inferential engine. A computer, as used herein, includes at least one instruction processor. An instruction processor includes at least one instruction processing element and at least one data processing element. Each of the data processing elements is controlled by at least one of the instruction processing elements. Preferably, the means for positioning 3000 may be embodied within the program system 1200 of FIG. 2 and 3. Alternatively, the means for positioning may be embodied within the servo program system 2000 of FIGS. 1 and 2. While the invention includes both implementations, the discussion of the means for positioning 3000 will be discussed in terms of the program system 1200. This has been done to simplify the discussion and is not meant to limit the scope of the claims.

In FIGS. 1 to 3, the servo controller 1030 drives the voice coil 32 to at least partly position the read head 500R to read access the read track 3110 on the rotating disk surface 12. The hard disk drive 10 of FIGS. 2 and 3 further include the servo controller 1030 driving a micro-actuator 310 to at least partly read position the read head 500R to read access the read track 3110 on the rotating disk surface 12.

Figure 14:
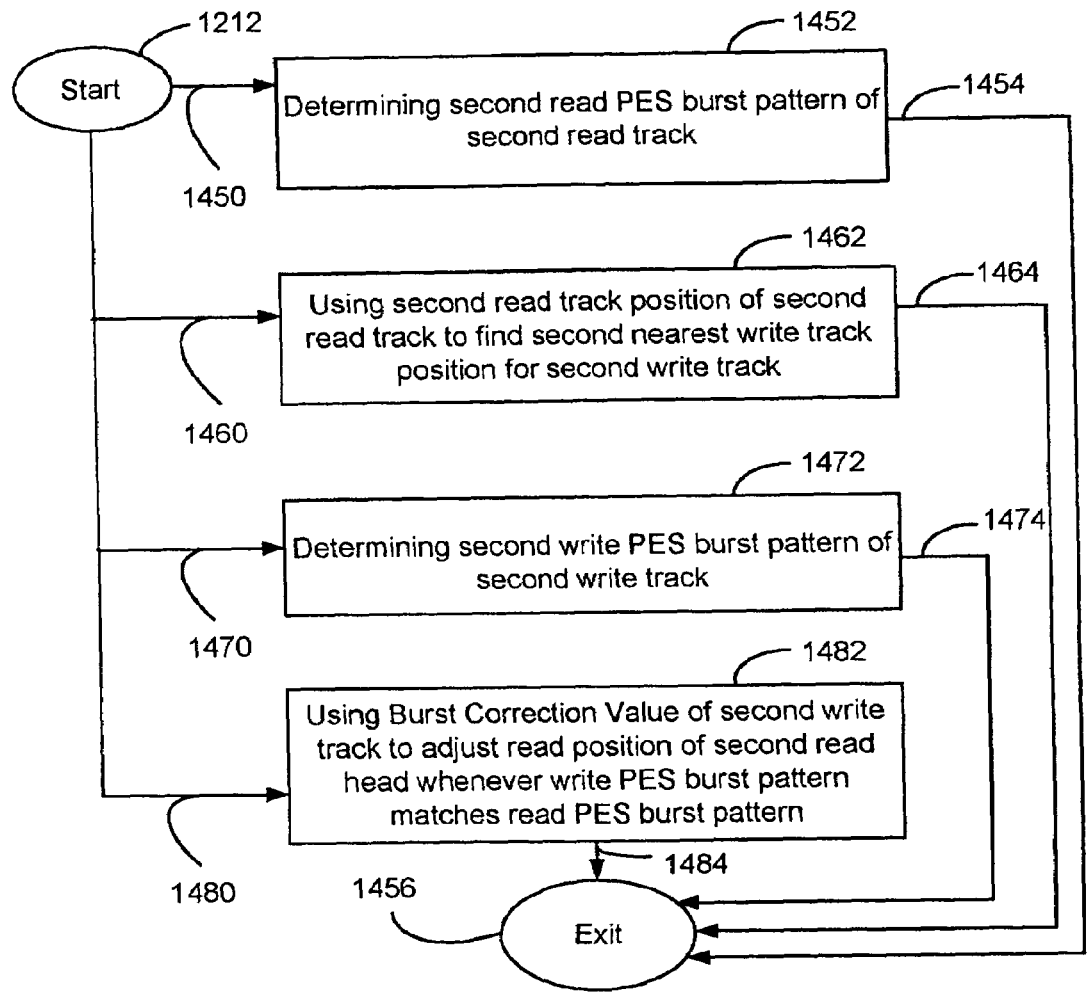
FIG. 14 shows a detail of the read positioning method of FIG. 6A for the second read-write head accessing the second rotating disk surface of FIG. 13.

The steps of the read positioning method 1212 of FIG. 6A are described in terms of the operations of FIGS. 8, 9A, and 14, as well as in terms of the track location table 1150 in FIGS. 2, 3, 11A, 11B and Table One. The use of the read positioning method 1212 is described in FIGS. 6A to 7B.

The hard disk drive may preferably include a computer 1100 directing the servo controller 1030 as in FIGS. 2 and 3. The computer 1100 may be accessibly coupled 1122 with a memory 1120 containing program steps of a program system 1200. The program system 1200 may direct the computer to implement the read positioning method 1212 and/or one of the read methods 1222 and/or 1232. Preferably, at least one of the steps of the read positioning method 1212 may be at least partly implemented as a program step. The program steps may implement the operations of the flowcharts.

The step and/or program step 1352 of FIG. 8 and/or means for determining 3002 of FIG. 1, the read PES burst pattern 3100 may include the following. Accessing a track location table 1150 to at least partly derive the read PES burst pattern 3100 for the read track position 3120. The track location table 1150 is shown in FIGS. 1 to 3, 11A, 11B, and Table One. The track location table 1150 may preferably reside in the memory 1120 accessibly coupled 1122 to the computer 1100 directing the servo controller.

The invention includes at least one read method for the hard disk drive. Preferably, the read positioning method 1212 of FIG. 6A may be used after a read access of the read track fails as outlined in FIGS. 6B and 7A. It often has a high probability of success, without the cost of iterative read access attempts based upon incrementing the read position of the read head. In some embodiments of the invention, after a read access using the read positioning method 1212, the iterative read access attempts may be performed as in FIG. 7B. These read methods may be used during initialization of the hard disk drive 10, and/or during normal operation of the hard disk drive. When used during the initialization, it is often unnecessary for the program system to reside in a non-volatile memory. When used during normal operation, it is often preferred for the program system 1200 to reside in a non-volatile memory 1126.

In FIGS. 1 and 2, the servo controller 1030 may preferably include a servo computer 1050 second accessibly coupled 1032 with a servo memory 1040. The invention's methods may be implemented in part by a servo program system 2000 directing the servo computer 1050. The servo program system 2000 preferably includes servo program steps residing in the servo memory 1040.

The hard disk drive 10 may include more than one accessible rotating disk surface as shown in FIGS. 12 and 13. In certain embodiments, the track location table 1150 may reference a second rotating disk surface 12-2, as indicated by the use of a rotating disk surface indicator 1159 in FIG. 11B. In other alternative embodiments, the second rotating disk surface 12-2 may be referenced by a second track location table 1151 as in FIG. 3.

FIG. 14 shows a detail flowchart of the read positioning method 1212 of FIG. 6A for the second read-write head 502 accessing the second rotating disk surface 12-2 of FIG. 13. Operation 1452 supports determining the second read PES burst pattern 3100 of the second read track 3110. Operation 1462 supports using the second read track position 3120 of the second read track 3110 to find a second nearest write track position 3130 for a second write track 3140. Operation 1472 supports determining the second write PES burst pattern 3150 of the second write track 3140. Operation 1482 supports using the Burst Correction Value 3170 of the second write track 3140 to adjust the read position 3160 of the second read head 502R whenever the second write PES burst pattern 3150 matches the second read PES burst pattern 3100.

In FIG. 14, by way of example, the second read PES burst pattern may be distinct from the read PES burst pattern 3100, however it is usually preferred that they be essentially the same. The discussion of FIG. 14 is done in that fashion to simplify that discussion and not to limit the scope of the claims.

The memory 1120 may include a non-volatile memory 1126 as in FIG. 3. A version of the program steps of the program system 1200 may reside in the non-volatile memory. The servo memory 1040 of FIGS. 1 and 2 may include a servo non-volatile memory similar to the non-volatile memory 1126 in FIG. 3. A version of the program steps of the servo program system 2000 may be stored in the servo non-volatile memory in a similar fashion.

Figure 15A:
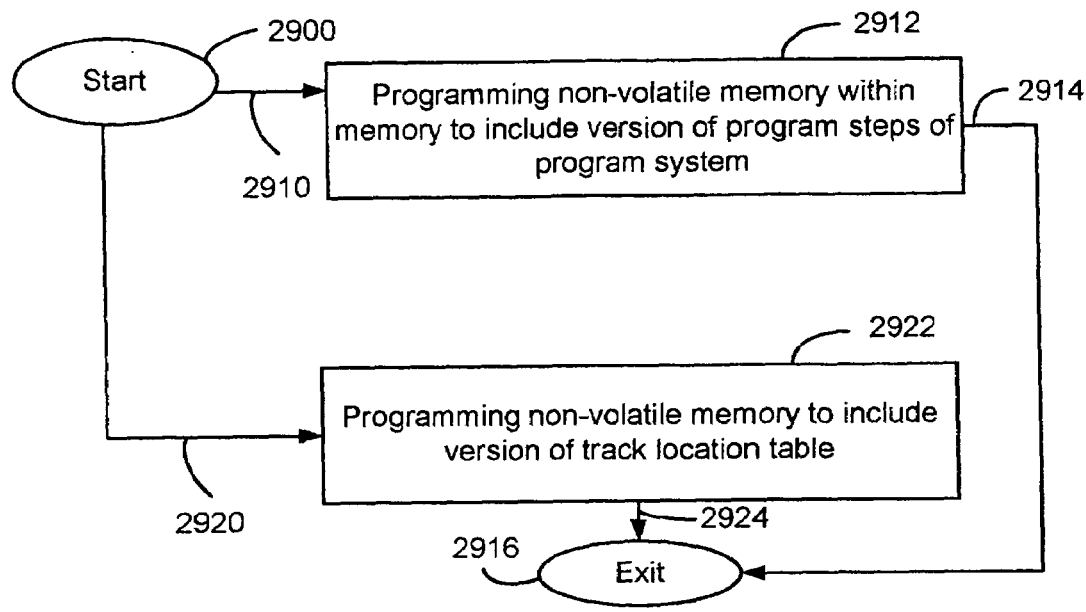
FIG. 15A shows a method of making the hard disk drive, of the preceding Figures.

The invention includes a method of making 2900 the hard disk drive 10, as shown in FIG. 15A. The method may include either and/or both of the operations. Operation 2912 supports programming the non-volatile memory 1126 within the memory 1120 to include a version of the program steps of the program system 1200. The version of the program steps implements at least one member of the version list 3100 shown in FIG. 15B. Operation 2922 support programming the non-volatile memory 1126 to include a version of the track location table 1150. The version of the track location table 1150 implements at least one member of the track table version list 3200 shown in FIG. 15C. The invention includes the hard disk drive 10, as a product of the process of the method of making 2900, shown in FIG. 15A. The track location table 1150 generated using the read methods of this invention is also the product of the invention's process.

Figure 15B:
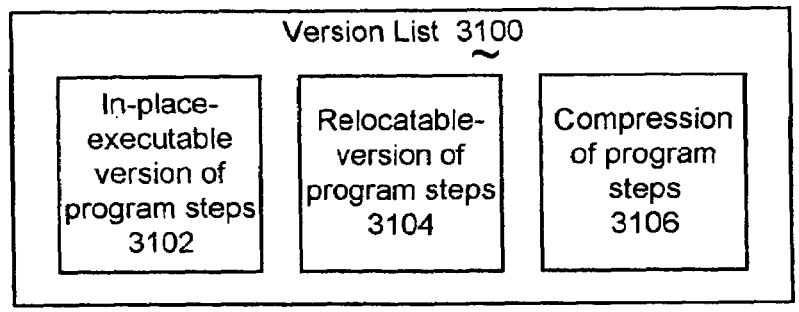
FIG. 15B shows the version list for the version of the program system to reside in the non-volatile memory of FIG. 3.
Figure 15C:
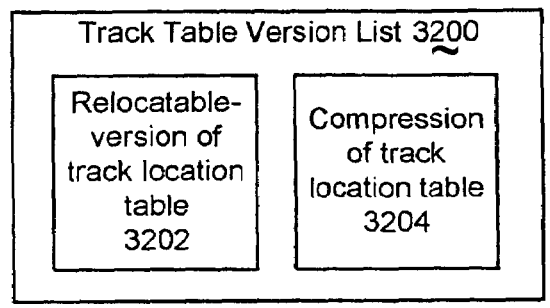
FIG. 15C shows the track table version list for the version of the track location table to reside in the non-volatile memory of FIG. 3.

FIG. 15B shows the version list 3100 including: an in-place-executable version of the program steps 3102, a relocatable-version of the program steps 3104, and a compression of the program steps 3106. FIG. 15C shows the track table version list 3200 including: a relocatable-version of the track location table 3202, and a compression of the track location table 3204.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A hard disk drive, comprising: a servo controller driving a voice coil actuator to at least partly read position at least one read head to read access a read track on at least one rotating disk surface;

a computer directing said servo controller to read with a read head a read track on a rotating disk surface within said hard disk drive; said computer is accessibly coupled to a memory;

wherein said computer is directed by a program system including program steps residing in said memory, comprising the program steps:

determining the read PES burst pattern of said read track;

using the read track position of said read track to find a nearest write track position for a write track;

predicting the write PES burst pattern of said write track; and adjusting said read position of said read head by the Burst Correction Value of said write track whenever said write PES burst pattern matches said read PES burst pattern;

wherein the program step determining said read PES burst pattern, further comprises the program step:

accessing a track location table to at least partly derive said read PES burst pattern for said read track position;

wherein the program step using said read track position to find said nearest write track position, further comprises the program step:

looking-up in said track location table to find said nearest write track position to said read track position;

wherein the program step predicting the write PES burst pattern of said write track, further comprises the program step:

accessing said track location table to at least partly derive said write PES burst pattern at said nearest write track position.

2. The hard disk drive of claim 1, wherein the program step using the Burst Correction Value further comprises the program steps:

determining when said write PES burst pattern matches said read PES burst pattern to set a pattern matching flag to match; and when said pattern matching flag set to match, adjusting said read position of said read head by said Burst Correction Value of said write track.

3. The hard disk drive of claim 1, wherein said program system, further comprises the program steps:

reading said read track with said read head to determine if an initial read access is successful; and using the program steps of claim 1 to read position said read head to access said read track for reading, whenever said initial read access is not successful.

4. The hard disk drive of claim 1, wherein said memory includes a non-volatile memory;

wherein said non-volatile memory includes a version of said track location table.

5. The hard disk drive of claim 4, wherein said non-volatile memory further includes said program steps.

6. The hard disk drive of claim 1, further comprising: said computer directing said servo controller to read, with a second read head, a second read track on a second rotating disk surface within said hard disk drive.

7. The hard disk drive of claim 6, wherein said programming system further comprises the program steps:

determining the second read PES burst pattern of said second read track;

using the second read track position of said second read track to find a second nearest write track position for a second write track;

determining the second write PES burst pattern of said second write track; and using the Burst Correction Value of said second write track to adjust said read position of said second read head whenever said second write PES burst pattern matches said second read PES burst pattern.

8. The hard disk drive of claim 7, wherein the program step determining said second read PES burst pattern, further comprises the program step:

accessing said track location table to at least partly derive said second read PES burst pattern for said second read track position.

9. The hard disk drive of claim 7, wherein the program step determining said second read PES burst pattern, further comprises the program step:

accessing a second track location table to at least partly derive said second read PES burst pattern for said second read track position.

10. The hard disk drive of claim 1, further comprising: said servo controller driving a micro-actuator to at least partly read position said read head to read access said read track on said rotating disk surface.

11. A method of manufacturing said hard disk drive of claim 1, comprising the steps:

programming a non-volatile memory within said memory to include a version of said program steps; and initializing said track location table.

12. A read positioning method for at least one read head accessing a read track on at least one rotating disk surface in a hard disk drive, comprising the steps:

determining the read PES burst pattern of said read track;

using the read track position of said read track to find a nearest write track position for a write track;

predicting the write PES burst pattern of said write track; and adjusting said read position of said read head by the Burst Correction Value of said write track whenever said write PES burst pattern matches said read PES burst pattern.

13. The method of claim 12, wherein the step determining said read PES burst pattern, further comprises at least one of the steps:

accessing a track location table to at least partly derive said read PES burst pattern for said read track position;

read-accessing a first sector in said read track to at least partly derive said read PES burst pattern;

read-accessing a second sector in said read track to at least partly further derive said read PES burst pattern; and predicting said read PES burst pattern based upon at least said read track position.

14. The method of claim 12, wherein the step using said read track position to find said nearest write track position, further comprises the step: looking-up in a track location table to find said nearest write track position for said read track position.

15. The method of claim 12, wherein the step predicting the write PES burst pattern of said write track, further comprised at least one of the steps:

accessing a track location table to at least partly derive said write PES burst pattern at said nearest write track position;

read-accessing a first sector at said nearest write track position to at least partly derive said write PES burst pattern;

read-accessing a second sector at said nearest write track position to at least partly further derive said write PES burst pattern; and predicting said write PES burst pattern based upon at least said nearest write track position.

16. The method of claim 12, wherein the step using the Burst Correction Value, further comprises the steps:
- determining when said write PES burst pattern matches said read PES burst pattern to set a pattern matching flag to match; and
- when said pattern matching flag set to match, adjusting said read position of said read head by said Burst Correction Value of said write track.

17. The method of claim 12, further comprises the step:
said read head reading with said read track, further comprising the steps:
- reading said read track with said read head to determine if an initial read access is successful; and
- reading said read track with said read head using said read positioning method, whenever said initial read access is not successful.

18. The method of claim 12, further comprises the step:
said read head reading said read track, comprising the steps:
- reading said read track with said read head to determine if an initial read access is successful;
- reading said read track with said read head using said read positioning method to determine if a second read access is successful, whenever said initial read access is not successful; and
- iteratively reading said read track with incremental positioning, whenever said second read access is not successful.

19. A hard disk drive implementing the method of claim 12, comprising:
- a servo controller driving a voice coil actuator to at least partly read position said read head to read access said read track on said rotating disk surface.

20. The hard disk drive of claim 19, wherein said servo controller includes a servo computer accessibly coupled with a servo memory; and
- wherein said servo controller at least partly implements said read positioning method by a servo program system comprised of at least one program step residing in said servo memory;
- wherein said servo program system, comprises at least one of the program steps:
- determining the read PES burst pattern of said read track;
- using the read track position of said read track to find said nearest write track position for said write track;
- predicting the write PES burst pattern of said write track; and
- adjusting said read position of said read head by the Burst Correction Value of said write track whenever said write PES burst pattern matches said read PES burst pattern.

21. The hard disk drive of claim 20, wherein said servo computer includes at least one instruction processor;
- wherein said instruction processor includes at least one instruction processing element and at least one data processing element;
- wherein each of said data processing elements is controlled by at least one of said instruction processing elements.

22. The hard disk drive of claim 19, further comprising: said servo controller driving a micro-actuator to at least partly read position said read head to read access said read track on said rotating disk surface.

23. A hard disk drive implementing the method of claim 12, comprising: a servo controller driving a voice coil actuator to read position said read head to read access said read track on said rotating disk surface;
- a computer directing said servo controller to read access said read track;
- said computer is accessibly coupled to a memory;
- a program system including at least one program step residing in said memory;
- wherein said program system directs said computer to at least partly implement said read positioning method; and
- wherein said program system, comprises at least one of the program steps:
- determining the read PES burst pattern of said read track;
- using the read track position of said read track to find said nearest write track position for said write track;
- predicting the write PES burst pattern of said write track; and
- adjusting said read position of said read head by the Burst Correction Value of said write track whenever said write PES burst pattern matches said read PES burst pattern.

24. The hard disk drive of claim 23, wherein said computer includes at least one instruction processor;
- wherein said instruction processor includes at least one instruction processing element and at least one data processing element;
- wherein each of said data processing elements is controlled by at least one of said instruction processing elements.

25. A hard disk drive implementing the method of claim 12, comprising:
- means for determining the read PES burst pattern of said read track;
- means for using the read track position of said read track to find said nearest write track position for said write track;
- means for predicting the write PES burst pattern of said write track; and
- means for adjusting said read position of said read head by the Burst Correction Value of said write track whenever said write PES burst pattern matches said read PES burst pattern.

26. The hard disk drive of claim 25, wherein at least one of said means includes at least one instance of at least one: a computer, a finite state machine, a neural network and an inferential engine;
- wherein said computer includes at least one instruction processor;
- wherein said instruction processor includes at least one instruction processing element and at least one data processing element; and
- wherein each of said data processing elements is controlled by at least one of said instruction processing elements.

27. A program system comprising program steps residing in a memory accessibly coupled to a computer within said hard disk drive implementing the method of claim 12; wherein said program system is comprised of the program steps of:
- determining the read PES burst pattern of said read track;
- using the read track position of said read track to find said nearest write track position for said write track;
- predicting the write PES burst pattern of said write track; and
- adjusting said read position of said read head by the Burst Correction Value of said write track whenever said write PES burst pattern matches said read PES burst pattern.

28. A method of making said hard disk drive of claim 27, comprising the step of:

programming a non-volatile memory within said memory to include a version of said program steps of said program system.

29. The method of claim 28, further comprising the step of:

programming said non-volatile memory to include a version of said track location table.

30. The method of claim 29, wherein said version of said track location table implements at least one member of the track table version list including: a relocatable-version of said track location table, and a compression of said track location table.

31. Said hard disk drive as a product the process of claim 28.

32. The method of claim 28, wherein said version of said program steps implements at least one member of the version list including: an in-place-executable version of said program steps, a relocatable-version of said program steps, and a compression of said program steps.

33. The method of claim 12, wherein said hard disk drive includes a second read head accessing a second read track on a second rotating disk surface; further comprising the steps:

determining the read PES burst pattern of said second read track;

using the second read track position of said second read track to find a nearest write track position for a second write track;

predicting the write PES burst pattern of said second write track; and using the Burst Correction Value of said second write track to adjust said read position of said second read head whenever said second write PES burst pattern matches said second read PES burst pattern.

\* \* \* \* \*